(12) United States Patent
Huang et al.

(10) Patent No.: US 11,582,439 B2
(45) Date of Patent: Feb. 14, 2023

(54) OCULAR OPTICAL SYSTEM

(71) Applicant: GENIUS ELECTRONIC OPTICAL CO., LTD., Taichung (TW)

(72) Inventors: Chun-Yang Huang, Taichung (TW); Wan-Chun Chen, Taichung (TW)

(73) Assignee: GENIUS ELECTRONIC OPTICAL CO., LTD., Taichung (TW)

(*) Notice: Subject to any disclaimer, the term of this patent is extended or adjusted under 35 U.S.C. 154(b) by 0 days.

(21) Appl. No.: 17/485,520

(22) Filed: Sep. 27, 2021

(65) Prior Publication Data

US 2022/0078400 A1  Mar. 10, 2022

Related U.S. Application Data

(63) Continuation of application No. 16/217,055, filed on Dec. 12, 2018, now Pat. No. 11,159,780.

(30) Foreign Application Priority Data

Sep. 20, 2018  (CN) .......................... 201811101697.6

(51) Int. Cl.
    *H04N 13/332* (2018.01)
    *A63F 13/26* (2014.01)
    *G02B 3/08* (2006.01)
(52) U.S. Cl.
    CPC ........... *H04N 13/332* (2018.05); *A63F 13/26* (2014.09); *G02B 3/08* (2013.01)

(58) Field of Classification Search
    CPC ......... H04N 13/332; A63F 13/26; G02B 3/08; G02B 25/001; G02B 27/0101; G02B 9/04
    USPC .......................................... 359/646
    See application file for complete search history.

(56) References Cited

U.S. PATENT DOCUMENTS

| 8,139,295 | B2 * | 3/2012 | Suzuki | G02B 5/1823 359/742 |
|---|---|---|---|---|
| 11,054,622 | B1 * | 7/2021 | Gollier | G02B 27/0172 |
| 2014/0347739 | A1 * | 11/2014 | Okano | G02B 25/001 359/646 |
| 2018/0275392 | A1 * | 9/2018 | Song | G02B 27/0025 |
| 2021/0011291 | A1 * | 1/2021 | Chen | G02B 3/04 |

* cited by examiner

*Primary Examiner* — Darryl J Collins
*Assistant Examiner* — Matthew Y Lee
(74) *Attorney, Agent, or Firm* — JCIPRNET

(57) ABSTRACT

An ocular optical system configured to allow imaging rays from a display image to enter an observer's eye through the ocular optical system so as to form an image is provided. A direction toward the eye is an eye side, and a direction toward the display image is a display side. The ocular optical system sequentially includes a first and a second lens elements having refracting power from the eye side to the display side along an optical axis. Each lens element includes an eye-side surface and a display-side surface. An optical axis region of the eye-side surface of the first lens element is concave. An optical axis region of the eye-side surface of the second lens element is concave.

20 Claims, 22 Drawing Sheets

| First Embodiment | | | | | | | |
|---|---|---|---|---|---|---|---|
| Effective focal length (EFL)= 29.969 mm, Half apparent field of view (ω)=65.000°, System length (SL)= 44.890 mm, F-number (Fno)=7.492, Image height (ImgH)= 29.157 mm | | | | | | | |
| Element | Surface | Radius of curvature (mm) | distance (mm) | Half of clear aperture (mm) | Refractive index | Abbe number | Focal length (mm) |
| Pupil 0 of observer | | Infinity | 12.960 | 2.000 | | | |
| First lens element 1 | Eye-side surface 15 | Infinity | 1.300 | 29.700 | 1.492 | 57.441 | 52.939 |
| | Display-side surface 16 | -26.033 | 0.866 | 30.700 | | | |
| Second lens element 2 | Eye-side surface 25 | Infinity | 1.560 | 31.160 | 1.492 | 57.441 | 66.574 |
| | Display-side surface 26 | -32.738 | 28.204 | 31.610 | | | |
| | Display image 100 | Infinity | | 29.309 | | | |

FIG. 11

| Surface | K | $a_2$ | $a_4$ | $a_6$ | $a_8$ |
|---|---|---|---|---|---|
| 16 | -4.972680E-01 | 0.000000E+00 | 7.416562E-06 | -7.018064E-09 | 3.053531E-12 |
| 26 | -2.815968E-01 | 0.000000E+00 | -5.845113E-06 | 3.596970E-09 | 2.380554E-12 |

FIG. 12

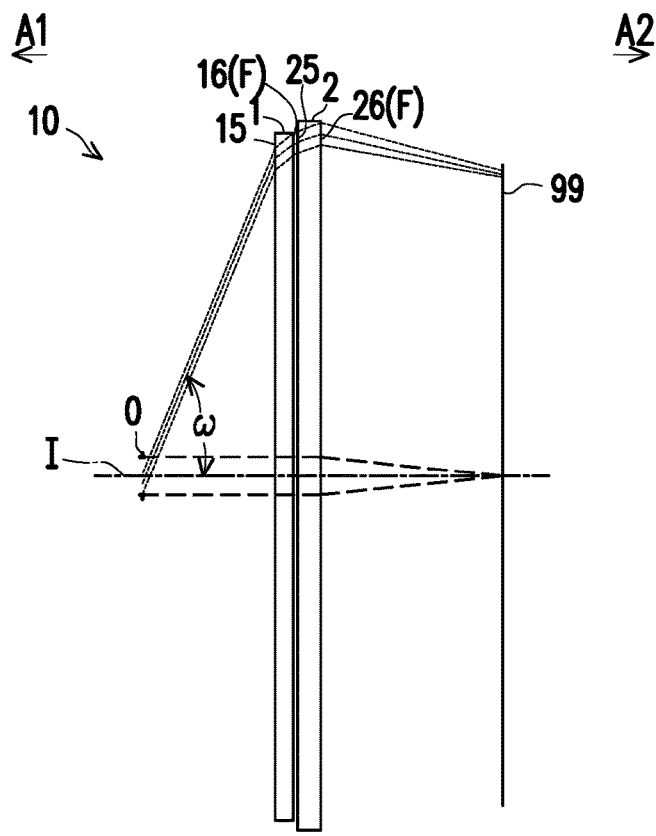
FIG. 13
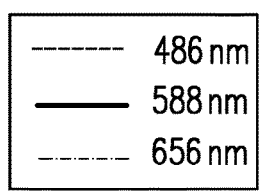
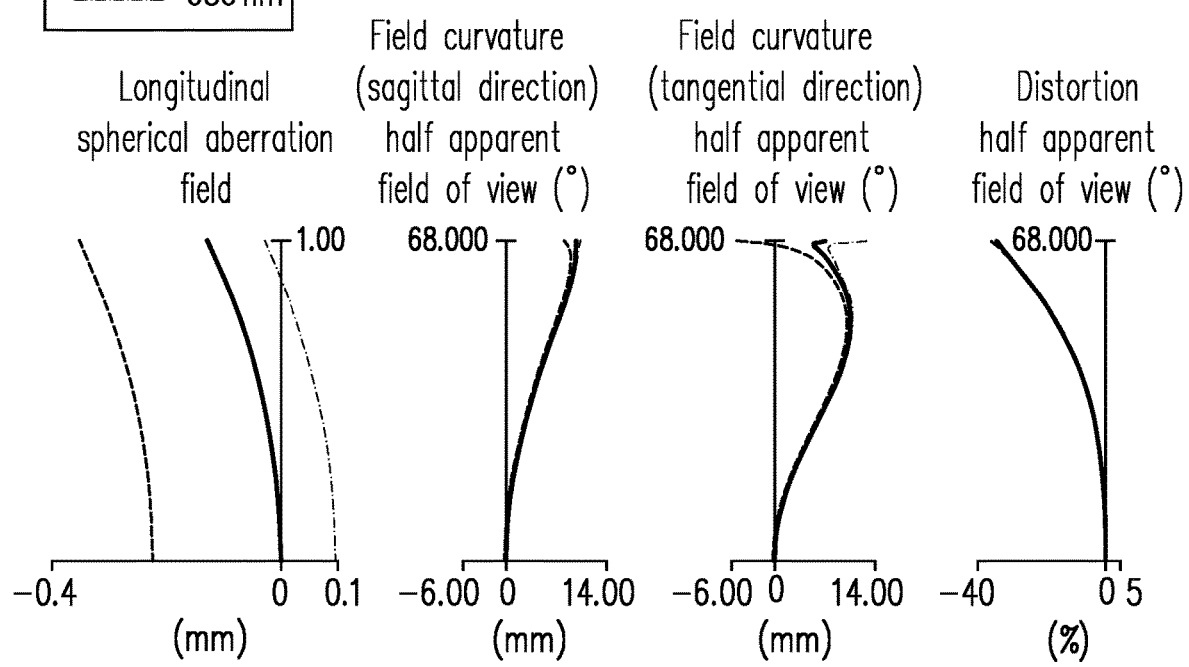
FIG. 14A   FIG. 14B   FIG. 14C   FIG. 14D

| Second Embodiment | | | | | | | |
|---|---|---|---|---|---|---|---|
| Effective focal length (EFL)= 19.795 mm, Half apparent field of view (ω)= 68.000°, System length (SL)= 35.565 mm, F-number (Fno)=4.949 , Image height (ImgH)= 29.828 mm | | | | | | | |
| Element | Surface | Radius of curvature (mm) | distance (mm) | Half of clear aperture (mm) | Refractive index | Abbe number | Focal length (mm) |
| Pupil 0 of observer | | Infinity | 13.000 | 2.000 | | | |
| First lens element 1 | Eye-side surface 15 | Infinity | 1.900 | 32.320 | 1.492 | 57.441 | 25.548 |
| | Display-side surface 16 | -12.563 | 0.130 | 33.830 | | | |
| Second lens element 2 | Eye-side surface 25 | Infinity | 2.375 | 33.940 | 1.492 | 57.441 | 81.982 |
| | Display-side surface 26 | -40.315 | 18.160 | 35.000 | | | |
| | Display image 100 | Infinity | | 30.570 | | | |

FIG. 15

| Surface | K | $a_2$ | $a_4$ | $a_6$ | $a_8$ |
|---|---|---|---|---|---|
| 16 | -1.567786E+00 | 0.000000E+00 | 9.992780E-06 | -1.656237E-08 | 7.926161E-12 |
| 26 | -9.607951E-04 | 0.000000E+00 | -1.848261E-05 | 1.447749E-08 | -3.607213E-12 |

FIG. 16

| Third Embodiment | | | | | | | |
|---|---|---|---|---|---|---|---|
| Effective focal length (EFL)= 29.530 mm, Half apparent field of view (ω)= 65.000°, System length (SL)= 46.287 mm, F-number (Fno)=7.382 , Image height (ImgH)= 29.009 mm | | | | | | | |
| Element | Surface | Radius of curvature (mm) | distance (mm) | Half of clear aperture (mm) | Refractive index | Abbe number | Focal length (mm) |
| Pupil 0 of observer | | Infinity | 12.000 | 2.000 | | | |
| First lens element 1 | Eye-side surface 15 | Infinity | 3.300 | 27.700 | 1.492 | 57.441 | 73.882 |
| | Display-side surface 16 | -36.332 | 0.180 | 30.240 | | | |
| Second lens element 2 | Eye-side surface 25 | Infinity | 2.750 | 30.300 | 1.492 | 57.441 | 47.843 |
| | Display-side surface 26 | -23.527 | 28.057 | 30.910 | | | |
| | Display image 100 | Infinity | | 29.193 | | | |

FIG. 19

| Surface | K | $a_2$ | $a_4$ | $a_6$ | $a_8$ |
|---|---|---|---|---|---|
| 16 | -4.250976E-01 | 0.000000E+00 | -6.216564E-06 | -7.033827E-09 | 1.765745E-12 |
| 26 | -7.549975E-01 | 0.000000E+00 | 4.925292E-06 | 2.443093E-09 | -4.685995E-13 |

FIG. 20

| Fourth Embodiment |||||||
|---|---|---|---|---|---|---|
| Effective focal length (EFL)= 34.077 mm, Half apparent field of view (ω)= 69.000°, System length (SL)= 46.229 mm, F-number (Fno)=8.519 , Image height (ImgH)= 33.665 mm |||||||
| Element | Surface | Radius of curvature (mm) | distance (mm) | Half of clear aperture (mm) | Refractive index | Abbe number | Focal length (mm) |
| Pupil 0 of observer | | Infinity | 12.000 | 2.000 | | | |
| First lens element 1 | Eye-side surface 15 | Infinity | 3.007 | 33.160 | 1.492 | 57.441 | 34.077 |
| | Display-side surface 16 | -16.757 | 0.479 | 35.580 | | | |
| Second lens element 2 | Eye-side surface 25 | Infinity | 4.383 | 35.670 | 1.492 | 57.441 | 10000000000.000 |
| | Display-side surface 26 | Infinity | 26.359 | 35.600 | | | |
| | Display image 100 | Infinity | | 34.026 | | | |

FIG. 23

| Surface | K | $a_2$ | $a_4$ | $a_6$ | $a_8$ |
|---|---|---|---|---|---|
| 16 | -9.776303E-01 | 0.000000E+00 | -1.353446E-05 | -7.160933E-09 | 4.988649E-12 |
| 26 | 0.000000E+00 | 0.000000E+00 | -1.683186E-06 | -5.782409E-10 | 0.000000E+00 |

FIG. 24

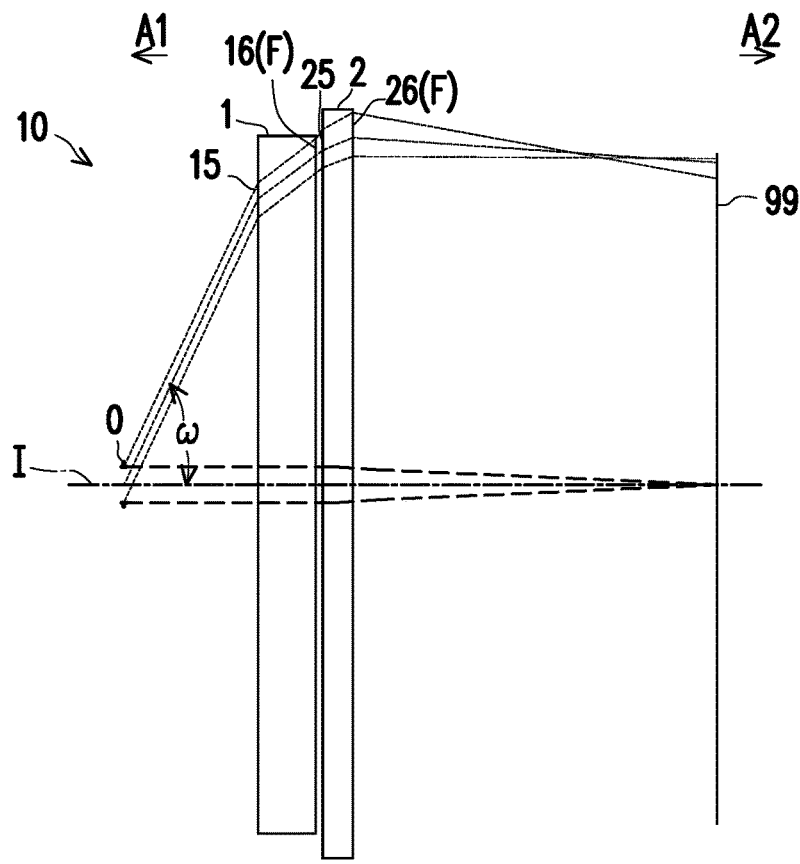
FIG. 25
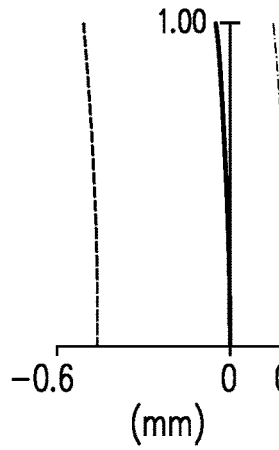
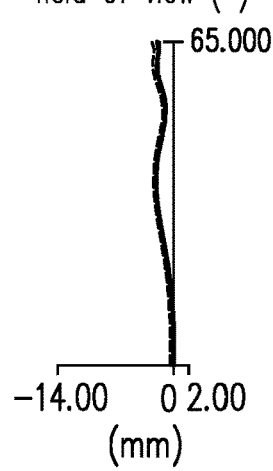
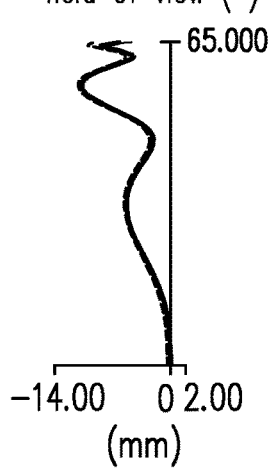
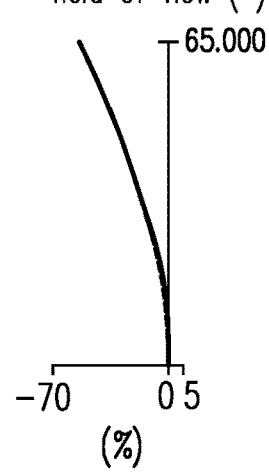
FIG. 26A  FIG. 26B  FIG. 26C  FIG. 26D

| Fifth Embodiment |||||||
|---|---|---|---|---|---|---|
| Effective focal length (EFL)=41.848 mm, Half apparent field of view (ω)= 65.000°, System length (SL)= 61.657 mm, F-number (Fno)=10.462 , Image height (ImgH)= 33.636 mm |||||||
| Element | Surface | Radius of curvature (mm) | distance (mm) | Half of clear aperture (mm) | Refractive index | Abbe number | Focal length (mm) |
| Pupil 0 of observer | | Infinity | 14.000 | 2.000 | | | |
| First lens element 1 | Eye-side surface 15 | Infinity | 6.046 | 31.780 | 1.492 | 57.441 | 46.373 |
| | Display-side surface 16 | -22.804 | 0.633 | 36.410 | | | |
| Second lens element 2 | Eye-side surface 25 | Infinity | 3.023 | 37.470 | 1.492 | 57.441 | 404.266 |
| | Display-side surface 26 | -198.800 | 37.956 | 39.080 | | | |
| | Display image 100 | Infinity | | 34.494 | | | |

FIG. 27

| Surface | K | $a_2$ | $a_4$ | $a_6$ | $a_8$ |
|---|---|---|---|---|---|
| 16 | -1.277174E+00 | 0.000000E+00 | 4.154565E-05 | -5.408873E-08 | 2.047167E-11 |
| 26 | 2.419747E+01 | 0.000000E+00 | -4.909612E-05 | 4.683806E-08 | -1.473196E-11 |

FIG. 28

| Sixth Embodiment |||||||
|---|---|---|---|---|---|---|
| Effective focal length (EFL)= 24.391 mm, Half apparent field of view (ω)= 65.000°, System length (SL)= 37.789 mm, F-number (Fno)=6.098 , Image height (ImgH)= 23.814 mm |||||||
| Element | Surface | Radius of curvature (mm) | distance (mm) | Half of clear aperture (mm) | Refractive index | Abbe number | Focal length (mm) |
| Pupil 0 of observer | | Infinity | 9.500 | 2.000 | | | |
| First lens element 1 | Eye-side surface 15 | 300.000 | 1.618 | 25.800 | 1.492 | 57.441 | 61.964 |
| | Display-side surface 16 | -33.856 | 0.228 | 26.160 | | | |
| Second lens element 2 | Eye-side surface 25 | Infinity | 3.809 | 26.200 | 1.492 | 57.441 | 38.346 |
| | Display-side surface 26 | -18.857 | 22.634 | 26.720 | | | |
| | Display image 100 | Infinity | | 23.983 | | | |

FIG. 31

| Surface | K | $a_2$ | $a_4$ | $a_6$ | $a_8$ |
|---|---|---|---|---|---|
| 16 | -2.698244E+00 | 0.000000E+00 | -2.074806E-05 | -2.542158E-08 | 1.969902E-11 |
| 26 | -1.385963E+00 | 0.000000E+00 | 3.629157E-06 | 7.379858E-09 | -5.927352E-12 |

FIG. 32

| Seventh Embodiment |||||||
|---|---|---|---|---|---|---|
| Effective focal length (EFL)=33.108 mm, Half apparent field of view (ω)= 67.500°, System length (SL)= 50.215 mm, F-number (Fno)=8.277 , Image height (ImgH)= 36.000 mm |||||||
| Element | Surface | Radius of curvature (mm) | distance (mm) | Half of clear aperture (mm) | Refractive index | Abbe number | Focal length (mm) |
| Pupil 0 of observer |  | Infinity | 13.000 | 2.000 |  |  |  |
| First lens element 1 | Eye-side surface 15 | 1000.000 | 2.800 | 34.832 | 1.492 | 57.441 | 65.005 |
|  | Display-side surface 16 | -33.149 | 0.500 | 36.482 |  |  |  |
| Second lens element 2 | Eye-side surface 25 | 1000.000 | 2.800 | 37.171 | 1.492 | 57.441 | 65.005 |
|  | Display-side surface 26 | -33.149 | 31.115 | 37.889 |  |  |  |
|  | Display image 100 | Infinity |  | 35.921 |  |  |  |

FIG. 35

| Surface | K | $a_2$ | $a_4$ | $a_6$ | $a_8$ |
|---|---|---|---|---|---|
| 16 | -3.941600E-01 | 0.000000E+00 | 0.000000E+00 | 2.611149E-10 | 1.184184E-12 |
| 26 | -3.941600E-01 | 0.000000E+00 | 0.000000E+00 | 2.611149E-10 | 1.184184E-12 |

FIG. 36

| Eighth Embodiment |||||||
|---|---|---|---|---|---|---|
| Effective focal length (EFL)= 32.784 mm, Half apparent field of view (ω)= 67.500°, System length (SL)= 50.517 mm, F-number (Fno)=37.517 , Image height (ImgH)= 35.995 mm |||||||
| Element | Surface | Radius of curvature (mm) | distance (mm) | Half of clear aperture (mm) | Refractive index | Abbe number | Focal length (mm) |
| Pupil 0 of observer | | Infinity | 13.000 | 2.000 | | | |
| First lens element 1 | Eye-side surface 15 | -800.000 | 2.800 | 31.838 | 1.492 | 57.441 | 63.836 |
| | Display-side surface 16 | -30.376 | 1.500 | 34.702 | | | |
| Second lens element 2 | Eye-side surface 25 | -800.000 | 2.800 | 35.167 | 1.492 | 57.441 | 63.836 |
| | Display-side surface 26 | -30.376 | 30.417 | 36.623 | | | |
| | Display image 100 | Infinity | | 35.890 | | | |

FIG. 39

| Surface | K | $a_2$ | $a_4$ | $a_6$ | $a_8$ |
|---|---|---|---|---|---|
| 16 | -4.440160E-01 | 0.000000E+00 | 0.000000E+00 | -8.360811E-10 | 2.177345E-12 |
| 26 | -4.440160E-01 | 0.000000E+00 | 0.000000E+00 | -8.360811E-10 | 2.177345E-12 |

FIG. 40

| Condition | First Embodiment | Second Embodiment | Third Embodiment | Fourth Embodiment | Fifth Embodiment | Sixth Embodiment | Seventh Embodiment | Eighth Embodiment |
|---|---|---|---|---|---|---|---|---|
| EFL | 29.969 | 19.795 | 29.530 | 34.077 | 41.848 | 24.391 | 33.108 | 32.784 |
| Fno | 7.492 | 4.949 | 7.382 | 8.519 | 10.462 | 6.098 | 8.277 | 37.517 |
| ω | 65.000 | 68.000 | 65.000 | 69.000 | 65.000 | 65.000 | 67.500 | 67.500 |
| ImgH | 29.157 | 29.828 | 29.009 | 33.665 | 33.636 | 23.814 | 36.000 | 35.995 |
| ER | 12.960 | 13.000 | 12.000 | 12.000 | 14.000 | 9.500 | 13.000 | 13.000 |
| T1 | 1.300 | 1.900 | 3.300 | 3.007 | 6.046 | 1.618 | 2.800 | 2.800 |
| G12 | 0.866 | 0.130 | 0.180 | 0.479 | 0.633 | 0.228 | 0.500 | 1.500 |
| T2 | 1.560 | 2.375 | 2.750 | 4.383 | 3.023 | 3.809 | 2.800 | 2.800 |
| G2D | 28.204 | 18.160 | 28.057 | 26.359 | 37.956 | 22.634 | 31.115 | 30.417 |
| V1 | 57.441 | 57.441 | 57.441 | 57.441 | 57.441 | 57.441 | 57.441 | 57.441 |
| V2 | 57.441 | 57.441 | 57.441 | 57.441 | 57.441 | 57.441 | 57.441 | 57.441 |
| D1 | 48.163 | 51.708 | 47.898 | 52.820 | 57.757 | 40.145 | 54.923 | 56.138 |
| D2 | 47.794 | 43.536 | 47.512 | 54.007 | 57.312 | 39.490 | 56.605 | 56.551 |
| D3 | 43.764 | 47.203 | 43.432 | 48.436 | 52.309 | 36.595 | 50.276 | 48.466 |
| D4 | 30.700 | 33.830 | 30.240 | 35.580 | 36.410 | 26.160 | 36.482 | 34.702 |
| TTL | 31.930 | 22.565 | 34.287 | 34.229 | 47.657 | 28.289 | 37.215 | 37.517 |
| ALT | 2.860 | 4.275 | 6.050 | 7.391 | 9.069 | 5.427 | 5.600 | 5.600 |
| SL | 44.890 | 35.565 | 46.287 | 46.229 | 61.657 | 37.789 | 50.215 | 50.517 |
| TL | 3.726 | 4.405 | 6.230 | 7.870 | 9.701 | 5.655 | 6.100 | 7.100 |
| ω/TL | 17.445 | 15.437 | 10.433 | 8.768 | 6.700 | 11.495 | 11.066 | 9.507 |
| D1/D2 | 1.008 | 1.188 | 1.008 | 0.978 | 1.008 | 1.017 | 0.970 | 0.993 |
| D3/D2 | 0.916 | 1.084 | 0.914 | 0.897 | 0.913 | 0.927 | 0.888 | 0.857 |
| T1/T2 | 0.833 | 0.800 | 1.200 | 0.686 | 2.000 | 0.425 | 1.000 | 1.000 |
| D4/ALT | 10.734 | 7.913 | 4.998 | 4.814 | 4.015 | 4.821 | 6.515 | 6.197 |
| D4/TL | 8.239 | 7.680 | 4.854 | 4.521 | 3.753 | 4.626 | 5.981 | 4.888 |
| ω/arctan(D4/EFL) | 1.423 | 1.140 | 1.423 | 1.492 | 1.584 | 1.383 | 1.413 | 1.448 |
| T1/G12 | 1.501 | 14.615 | 18.333 | 6.278 | 9.556 | 7.093 | 5.600 | 1.867 |
| T2/G12 | 1.801 | 18.269 | 15.278 | 9.150 | 4.778 | 16.700 | 5.600 | 1.867 |
| TTL/ALT | 11.164 | 5.278 | 5.667 | 4.631 | 5.255 | 5.213 | 6.646 | 6.700 |
| TTL/TL | 8.569 | 5.123 | 5.504 | 4.350 | 4.912 | 5.003 | 6.101 | 5.284 |
| G2D/T1 | 21.695 | 9.558 | 8.502 | 8.765 | 6.278 | 13.992 | 11.112 | 10.863 |
| G2D/T2 | 18.079 | 7.646 | 10.203 | 6.014 | 12.557 | 5.942 | 11.112 | 10.863 |
| EFL/T1 | 23.053 | 10.418 | 8.948 | 11.331 | 6.922 | 15.077 | 11.824 | 11.709 |
| EFL/T2 | 19.211 | 8.335 | 10.738 | 7.774 | 13.844 | 6.404 | 11.824 | 11.709 |
| EFL/ALT | 10.479 | 4.630 | 4.881 | 4.611 | 4.615 | 4.495 | 5.912 | 5.854 |
| EFL/TL | 8.043 | 4.494 | 4.740 | 4.330 | 4.314 | 4.313 | 5.427 | 4.617 |

FIG. 41

OCULAR OPTICAL SYSTEM

CROSS REFERENCE TO RELATED APPLICATION

This application is a continuation application of and claims the priority benefit of U.S. patent application Ser. No. 16/217,055, filed on Dec. 12, 2018, now allowed, which claims the priority benefit of China application serial no. 201811101697.6, filed on Sep. 20, 2018. The entirety of each of the above-mentioned patent applications is hereby incorporated by reference herein and made a part of specification.

BACKGROUND

Technical Field

The present disclosure relates to an optical system, and particularly relates to an ocular optical system.

Description of Related Art

Virtual Reality (VR) refers to using computer technologies to simulate and generate a three-dimensional virtual world, which enables immersive simulation for users by providing simulations pertaining to visual sensation, auditory sensation and other sensations to users. The currently existing VR devices are mainly focused on visual experiences. Binocular parallax of human eyes is simulated by separated images with two slightly different perspectives corresponding to the left and right eyes to achieve a stereo vision. In order to reduce the volume of the VR device so users can receive a magnified visual sensation from a smaller display image, an ocular optical system with magnifying capability is now one of major topics in research and development for VR.

As far as the conventional ocular optical systems are concerned, the half apparent field of view is small and causing the observers to see black shadow surrounding the display image. Therefore, there is a need to improve the user immersion to the virtual world. Besides, if the half apparent field of view increased, the volume and weight of the lens and the display image would double. Thus, how to increase the half apparent field of view and reduce the volume and weight of an ocular optical system is an issue to work on.

To make the aforementioned more comprehensible, several embodiments accompanied with drawings are described in detail as follows.

SUMMARY

The present disclosure provides an ocular optical system with a thinner thickness, a large half apparent field of view and desirable imaging quality.

An embodiment of the disclosure provides an ocular optical system. The ocular optical system is configured to allow imaging rays from a display image to enter an eye of an observer through the ocular optical system to form an image. A side toward the eye is an eye side, and a side toward the display image is a display side. The ocular optical system comprises a first lens element and a second lens element sequentially arranged along an optical axis from the eye side to the display side. Each of the first lens element and the second lens element comprises an eye-side surface facing the eye side and allowing the imaging rays to pass through and a display-side surface facing the display side and allowing the imaging rays to pass through. An optical axis region of the eye-side surface of the first lens element is concave. An optical axis region of the eye-side surface of the second lens element is concave. Lens elements of the ocular optical system are only the two lens elements described above. The ocular optical system satisfies: $4.340 \leq TTL/TL$, wherein TTL is a distance from the eye-side surface of the first lens element to the display image on the optical axis, and TL is a distance from the eye-side surface of the first lens element to the display-side surface of the second lens element on the optical axis.

An embodiment of the disclosure provides an ocular optical system. The ocular optical system is configured to allow imaging rays from a display image to enter an eye of an observer through the ocular optical system to form an image. A side toward the eye is an eye side, and a side toward the display image is a display side. The ocular optical system comprises a first lens element and a second lens element sequentially arranged along an optical axis from the eye side to the display side. Each of the first lens element and the second lens element comprises an eye-side surface facing the eye side and allowing the imaging rays to pass through and a display-side surface facing the display side and allowing the imaging rays to pass through. The second lens element has a positive refracting power, and an optical axis region of the eye-side surface of the second lens element is concave. Lens elements of the ocular optical system are only the two lens elements described above. The ocular optical system satisfies: $4.340 \leq TTL/TL$, wherein TTL is a distance from the eye-side surface of the first lens element to the display image on the optical axis, and TL is a distance from the eye-side surface of the first lens element to the display-side surface of the second lens element on the optical axis.

An embodiment of the disclosure provides an ocular optical system. The ocular optical system is configured to allow imaging rays from a display image to enter an eye of an observer through the ocular optical system to form an image. A side toward the eye is an eye side, and a side toward the display image is a display side. The ocular optical system comprises a first lens element and a second lens element sequentially arranged along an optical axis from the eye side to the display side. Each of the first lens element and the second lens element comprises an eye-side surface facing the eye side and allowing the imaging rays to pass through and a display-side surface facing the display side and allowing the imaging rays to pass through. A periphery region of the eye-side surface of the first lens element is concave. An optical axis region of the eye-side surface of the second lens element is concave. Lens elements of the ocular optical system are only the two lens elements described above. The ocular optical system satisfies: $5.500 \leq G2D/T1$, wherein G2D is a distance from the display-side surface of the second lens element to the display image on the optical axis, and T1 is a thickness of the first lens element on the optical axis.

Based on the above, in the ocular optical system of the embodiments of the present disclosure, through surface design of the first lens element and the second lens element combined with any of the following three conditional expressions: (1). $4.340 \leq TTL/TL$ or (2). $5.500 \leq G2D/T1$, the half apparent field of view may be increased without increasing the system size and weight while maintaining the size of the display image, and desirable imaging quality is provided.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 11 shows detailed optical data pertaining to the ocular optical system according to the first embodiment of the present disclosure.

FIG. 12 shows aspheric coefficients pertaining to the ocular optical system according to the first embodiment of the present disclosure.

FIG. 13 is a schematic view illustrating an ocular optical system according to a second embodiment of the present disclosure.

FIGS. 14A to 14D illustrate a longitudinal spherical aberration and other aberrations of the ocular optical system according to the second embodiment.

FIG. 15 shows detailed optical data pertaining to the ocular optical system according to the second embodiment of the present disclosure.

FIG. 16 shows aspheric coefficients pertaining to the ocular optical system according to the second embodiment of the present disclosure.

FIG. 19 shows detailed optical data pertaining to the ocular optical system according to the third embodiment of the present disclosure.

FIG. 20 shows aspheric coefficients pertaining to the ocular optical system according to the third embodiment of the present disclosure.

FIG. 23 shows detailed optical data pertaining to the ocular optical system according to the fourth embodiment of the present disclosure.

FIG. 24 shows aspheric coefficients pertaining to the ocular optical system according to the fourth embodiment of the present disclosure.

FIG. 25 is a schematic view illustrating an ocular optical system according to a fifth embodiment of the present disclosure.

FIGS. 26A to 26D illustrate a longitudinal spherical aberration and other aberrations of the ocular optical system according to the fifth embodiment.

FIG. 27 shows detailed optical data pertaining to the ocular optical system according to the fifth embodiment of the present disclosure.

FIG. 28 shows aspheric coefficients pertaining to the ocular optical system according to the fifth embodiment of the present disclosure.

FIG. 31 shows detailed optical data pertaining to the ocular optical system according to the sixth embodiment of the present disclosure.

FIG. 32 shows aspheric coefficients pertaining to the ocular optical system according to the sixth embodiment of the present disclosure.

FIG. 35 shows detailed optical data pertaining to the ocular optical system according to the seventh embodiment of the present disclosure.

FIG. 36 shows aspheric coefficients pertaining to the ocular optical system according to the seventh embodiment of the present disclosure.

FIG. 39 shows detailed optical data pertaining to the ocular optical system according to the eighth embodiment of the present disclosure.

FIG. 40 shows aspheric coefficients pertaining to the ocular optical system according to the eighth embodiment of the present disclosure.

FIG. 41 shows important parameters and relation values thereof pertaining to the ocular optical system according to the first to eighth embodiments of the present disclosure.

DESCRIPTION OF THE EMBODIMENTS

Figure 1:
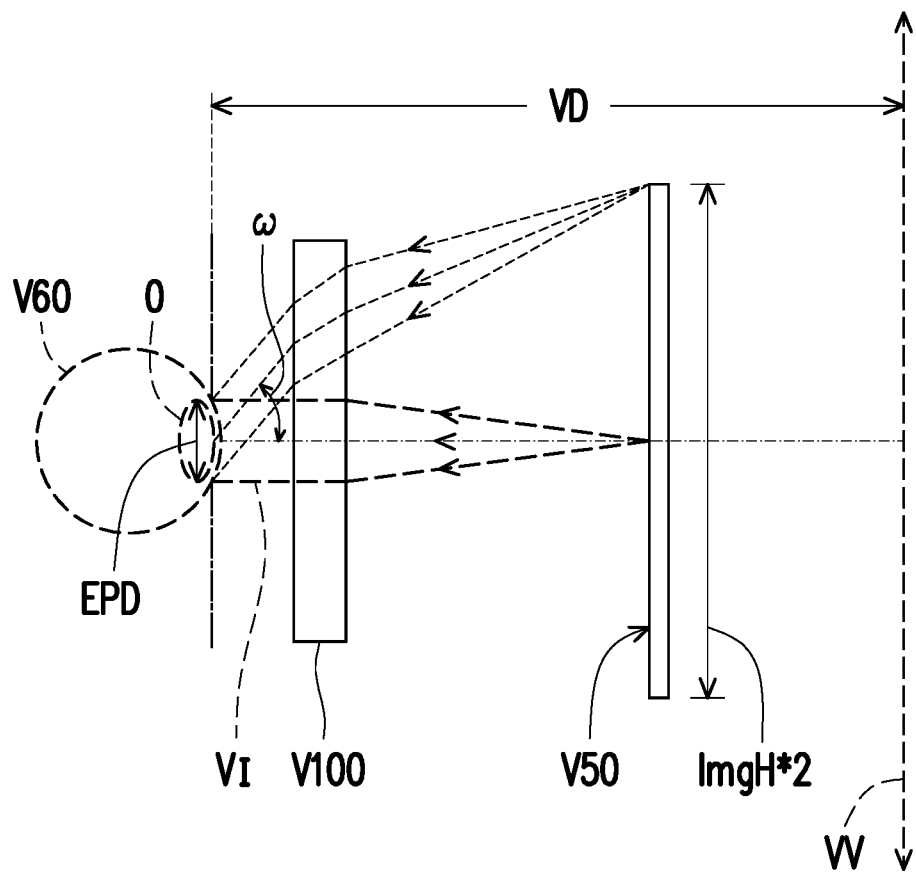
FIG. 1 is a schematic view illustrating an ocular optical system.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a virtual image distance VD, as depicted in FIG. 1. The following criteria for determining optical specifications of the present application are based on assumption that a reversely tracking of the ray direction is parallel imaging rays passing through the ocular optical system from an eye-side and focused on the display screen for imaging.

Figure 2:
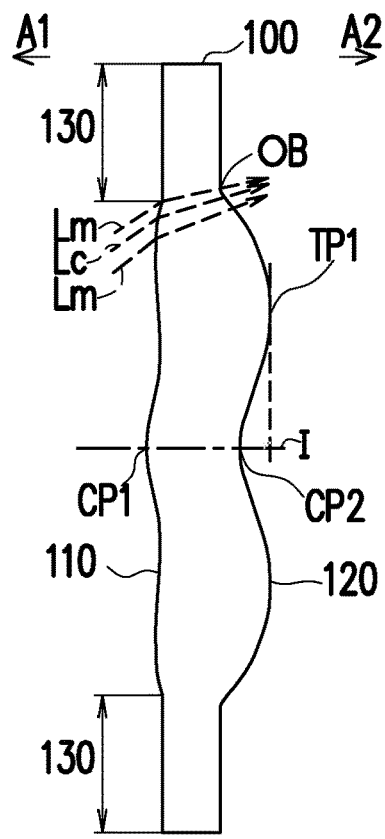
FIG. 2 is a schematic view illustrating a surface structure of a lens element.

In the present disclosure, the optical system may comprise at least one lens element to receive imaging rays that are incident on the optical system over a set of angles ranging from parallel to an optical axis to a half apparent field of view angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an eye-side (or display-side) surface of a lens element" refers to a specific region of that surface of the lens element at which imaging rays can pass through that specific region. Imaging rays include at least two types of rays: a chief ray Lc and a marginal ray Lm (as shown in FIG. 2). An eye-side (or display-side) surface of a lens element can be characterized as having several regions, including an optical axis region, a periphery region, and, in some cases, one or more intermediate regions, as discussed more fully below.

Figure 5:
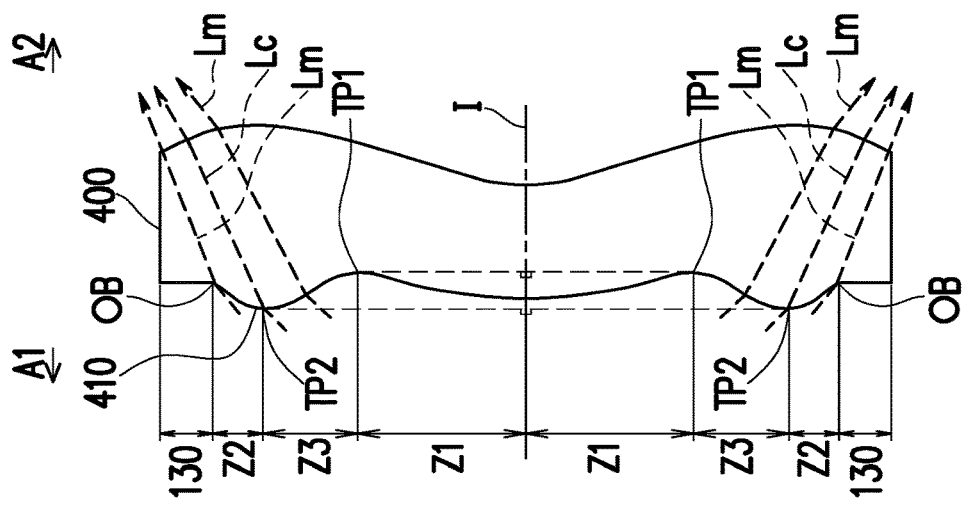
FIG. 5 is a schematic view illustrating the surface structure of a lens element according to a second example.

FIG. 2 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 2, a first central point CP1 may be present on the eye-side surface 110 of lens element 100 and a second central point CP2 may be present on the display-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 5), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 2, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 3:
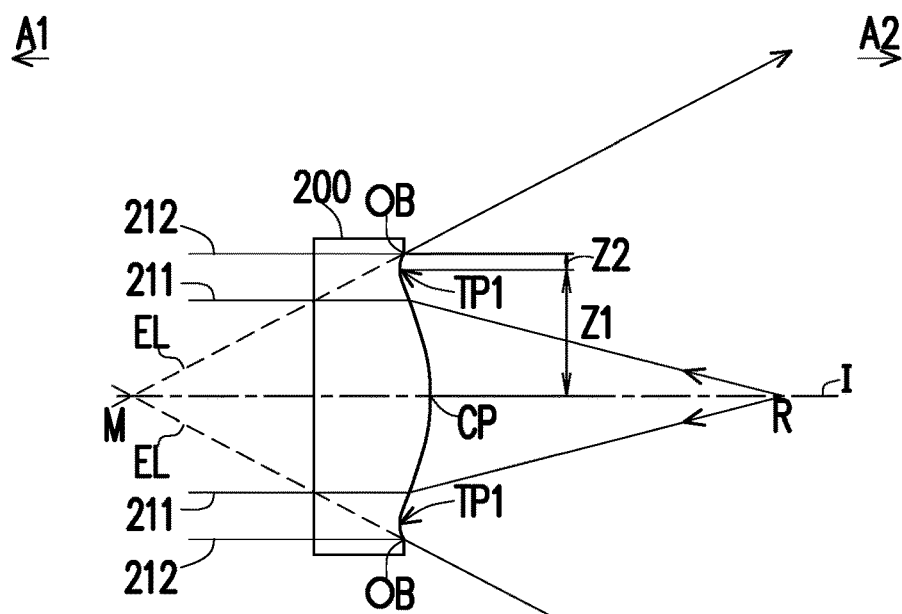
FIG. 3 is a schematic view illustrating a concave and convex surface structure and a ray focal point of a lens element.

Referring to FIG. 3, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 3. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 3. Accordingly, since the extension line EL of the ray intersects the optical axis I on the object side A1 of the lens element 200, periphery region Z2 is concave. In the lens element 200 illustrated in FIG. 3, the first transition point TP1 is the border of the optical axis region and the periphery region, i.e., TP1 is the point at which shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an eye-side surface, a positive R value defines that the optical axis region of the eye-side surface is convex, and a negative R value defines that the optical axis region of the eye-side surface is concave. Conversely, for a display-side surface, a positive R value defines that the optical axis region of the display-side surface is concave, and a negative R value defines that the optical axis region of the display-side surface is convex. The result found by using this method should be consistent with the method utilizing intersection of the optical axis by rays/extension lines mentioned above, which determines surface shape by referring to whether the focal point of a collimated ray being parallel to the optical axis I is on the eye-side or the display-side of a lens element. As used herein, the terms "a shape of a region is convex (concave),"

"a region is convex (concave)," and "a convex- (concave-) region," can be used alternatively.

Figure 6:
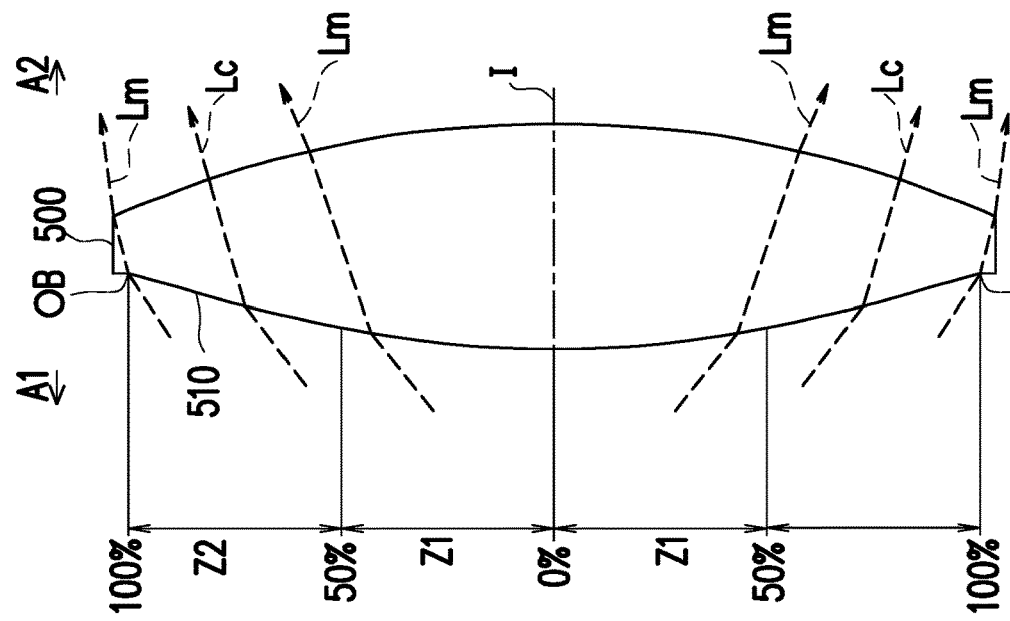
FIG. 6 is a schematic view illustrating the surface structure of a lens element according to a third example.
Figure 4:
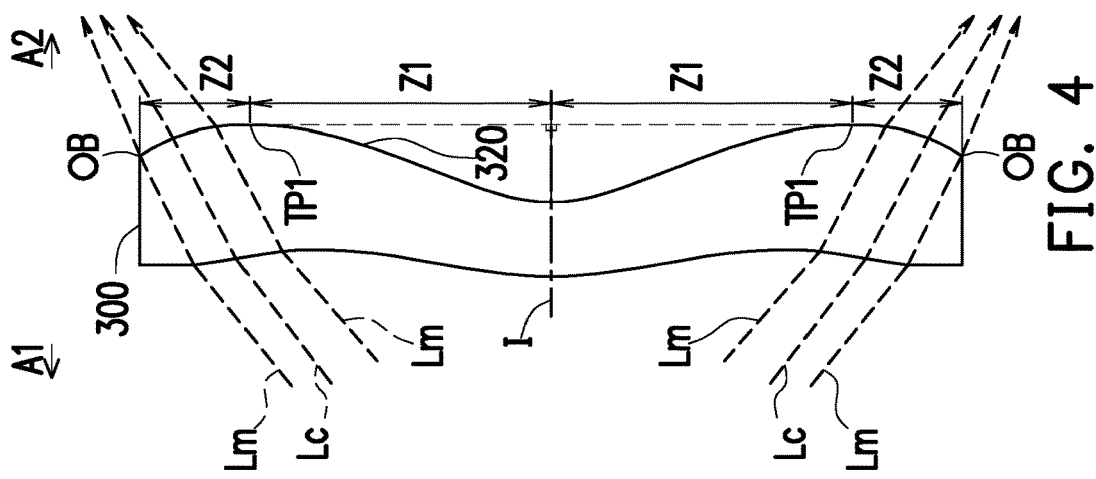
FIG. 4 is a schematic view illustrating the surface structure of a lens element according to a first example.

FIG. 4, FIG. 5 and FIG. 6 illustrate examples of determining the shape of lens element regions and the boundaries of regions under various circumstances, including the optical axis region, the periphery region, and intermediate regions as set forth in the present specification.

FIG. 4 is a radial cross-sectional view of a lens element 300. As illustrated in FIG. 4, only one transition point TP1 appears within the optical boundary OB of the display-side surface 320 of the lens element 300. Optical axis region Z1 and periphery region Z2 of the display-side surface 320 of lens element 300 are illustrated. The R value of the display-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 4, since the shape of the optical axis region Z1 is concave, the shape of the periphery region Z2 will be convex as the shape changes at the transition point TP1.

FIG. 5 is a radial cross-sectional view of a lens element 400. Referring to FIG. 5, a first transition point TP1 and a second transition point TP2 are present on the eye-side surface 410 of lens element 400. The optical axis region Z1 of the eye-side surface 410 is defined between the optical axis I and the first transition point TP1. The R value of the eye-side surface 410 is positive (i.e., R>0). Accordingly, the optical axis region Z1 is convex.

The periphery region Z2 of the eye-side surface 410, which is also convex, is defined between the second transition point TP2 and the optical boundary OB of the eye-side surface 410 of the lens element 400. Further, intermediate region Z3 of the eye-side surface 410, which is concave, is defined between the first transition point TP1 and the second transition point TP2. Referring once again to FIG. 5, the eye-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the eye-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 6 is a radial cross-sectional view of a lens element 500. Lens element 500 has no transition point on the eye-side surface 510 of the lens element 500. For a surface of a lens element with no transition point, for example, the eye-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 6, the optical axis region Z1 of the eye-side surface 510 is defined between the optical axis I and 50% of the distance between the optical axis I and the optical boundary OB. The R value of the eye-side surface 510 is positive (i.e., R>0). Accordingly, the optical axis region Z1 is convex. For the eye-side surface 510 of the lens element 500, because there is no transition point, the periphery region Z2 of the eye-side surface 510 is also convex. It should be noted that lens element 500 may have a mounting portion (not shown) extending radially outward from the periphery region Z2.

Figure 7A:
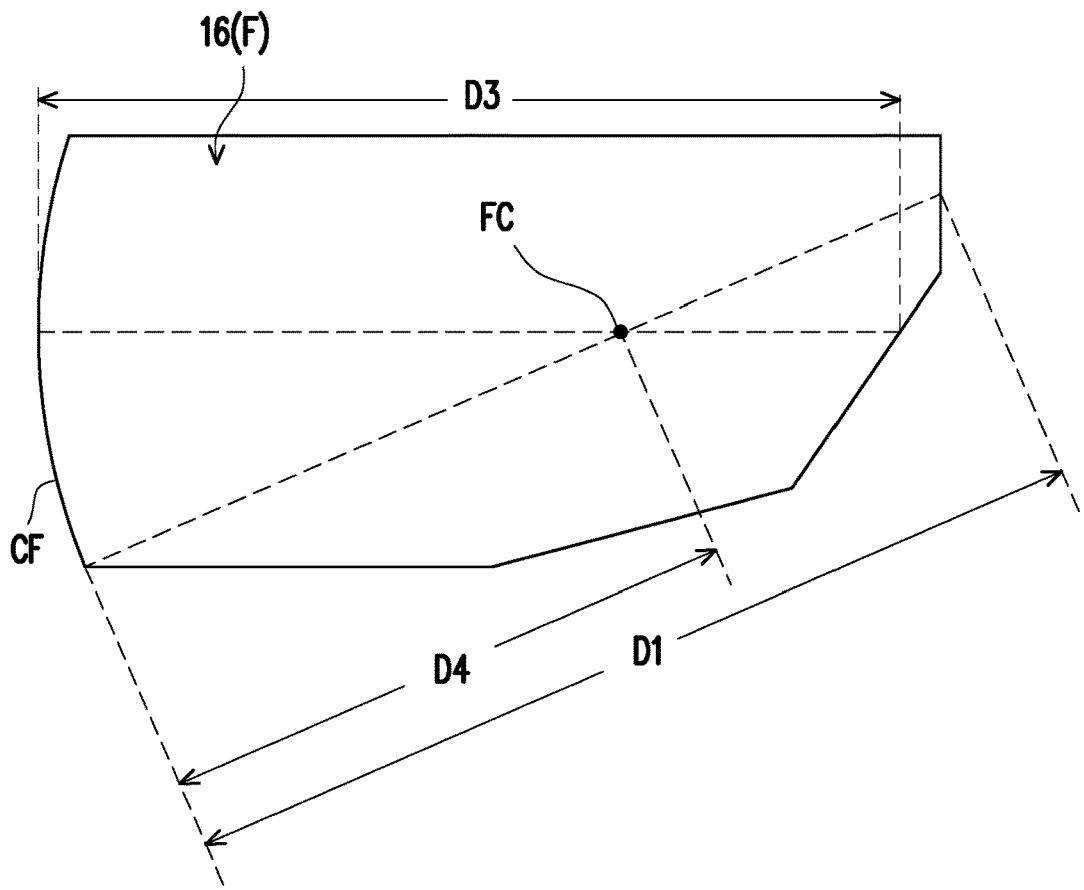
FIG. 7A is a schematic view illustrating a cutting shape and lens element parameters of a lens element according to an embodiment of the present disclosure.
Figure 7B:
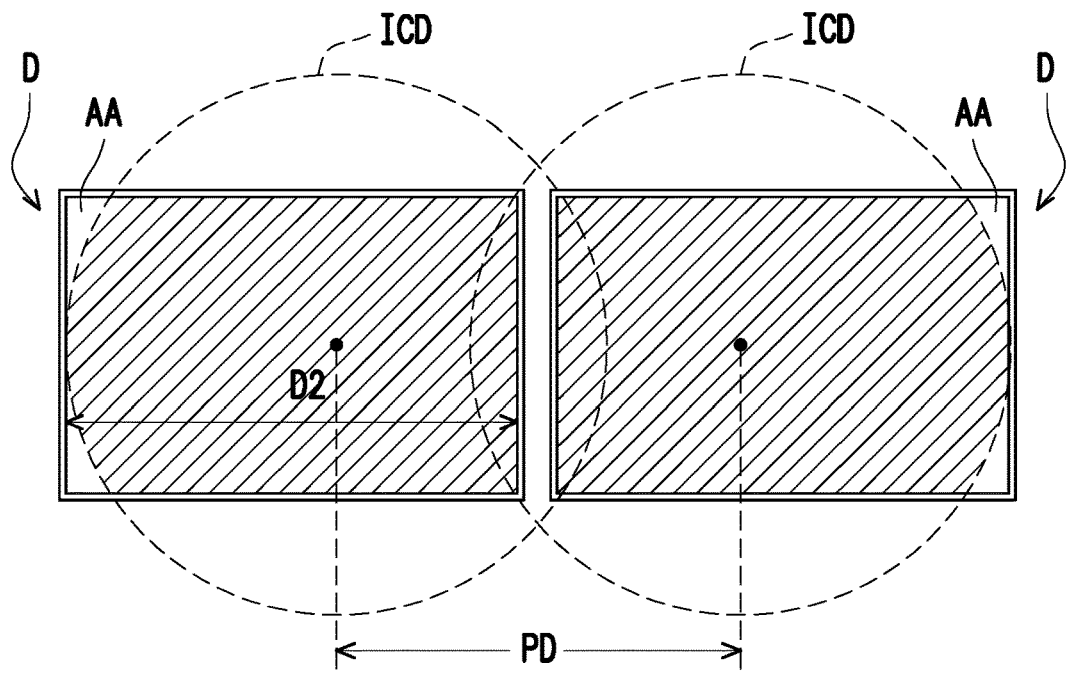
FIG. 7B is a schematic view illustrating a cutting shape and display image parameters of a display image according to an embodiment of the present disclosure.

FIG. 7A is a schematic view illustrating a cutting shape and lens element parameters of a lens element according to an embodiment of the present disclosure. FIG. 7B is a schematic view illustrating a cutting shape and display image parameters of a display image according to an embodiment of the present disclosure. Referring to FIG. 7A and FIG. 7B, since an ocular optical system according to an embodiment of the present disclosure is designed with a large half apparent field of view, the lens element and the display image cannot cover the image circle diameter ICD corresponding to the maximum angle of a single eye due to the pupil distance PD between two eyes. Therefore, the shape of the lens element of an embodiment of the present disclosure needs to be cut and the shape of the display image of an embodiment of the present disclosure also changes, as shown in FIG. 7A and FIG. 7B respectively. The effective display image is the overlap portion between the image circle diameter ICD of the two eyes and the display area AA of the display D (that is, the area marked by oblique lines). Lens elements parameters and display image parameters will be defined in detail in the following paragraphs.

Figure 8:
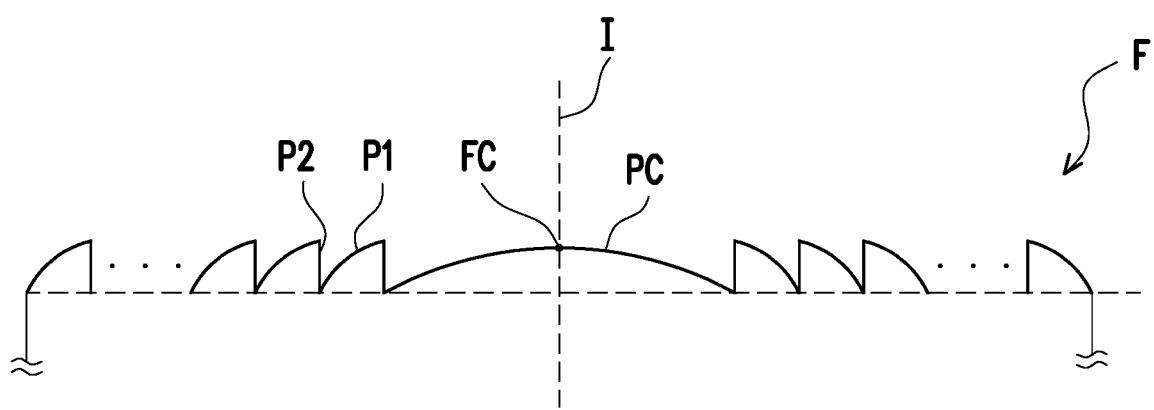
FIG. 8 is a schematic view illustrating a schematic view of a Fresnel surface according to an embodiment of the present disclosure.

From a macroscopic point of view, details of the shape of a Fresnel surface of a lens element according to an embodiment of the present disclosure are relatively small, and the specific shape is not easy to be seen. To elaborate on a Fresnel surface according to an embodiment of the present disclosure, please refer to FIG. 8. FIG. 8 is an enlarged schematic view of a Fresnel surface, for example, a schematic view of a convex-style Fresnel surface. In the embodiments of the present disclosure, a Fresnel surface F represents the surface of the Fresnel lens. The Fresnel surface F has a plurality of concentric annular teeth surrounding the center of the Fresnel surface FC, the plurality of annular teeth surround a central convex surface PC. Each of the annular teeth has an effective sub-surface P1 capable of refracting incident light into a predetermined direction and an ineffective sub-surface P2 connecting adjacent two effective sub-surfaces P1. These effective sub-surfaces P1 and central convex surface PC refract incident light into the predetermined direction.

Figure 9:
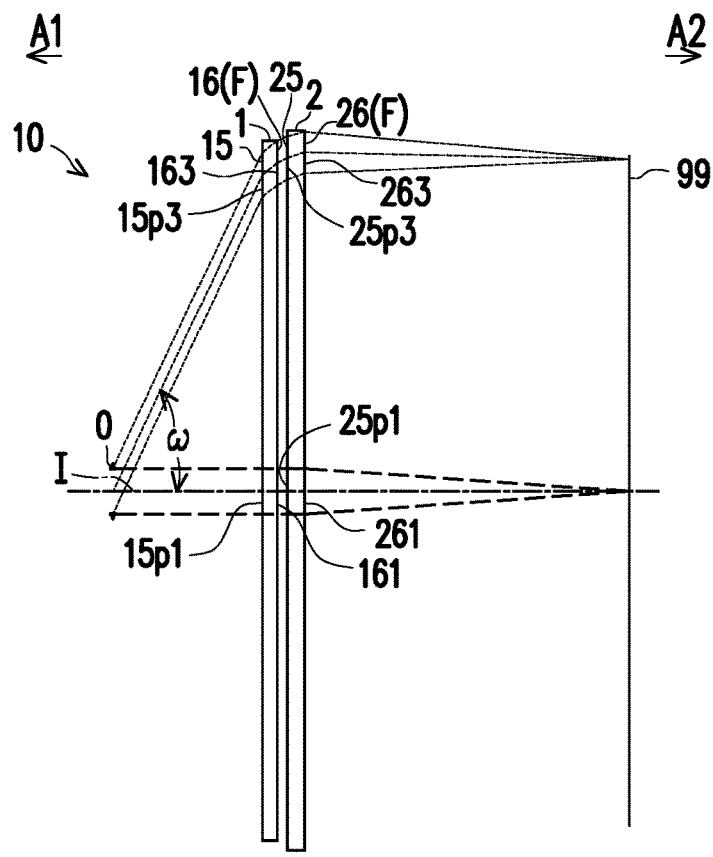
FIG. 9 is a schematic view illustrating an ocular optical system according to a first embodiment of the present disclosure.

FIG. 9 is a schematic view of the ocular optical system according to the first embodiment of the present disclosure, and FIGS. 10A to 10D illustrate a longitudinal spherical aberration and other aberrations of the ocular optical system according to the first embodiment. Referring to FIG. 9, an ocular optical system 10 according to the first embodiment of the present disclosure is configured to allow the imaging rays from a display image 99 to enter an eye of an observer through the ocular optical system 10 and a pupil 0 of the eye of the observer to form an image. The display image 99 is perpendicular to an optical axis to favor the corrections of various aberrations of the imaging rays and avoid poorer aberrations on a tilted side with respect to the optical axis when an angle between the display image and the optical axis I is not equal to 90 degrees. The eye side A1 is a side toward the eye of the observer, and the display side A2 is a side toward the display image 99. In the embodiment, the ocular optical system 10 comprises a first lens element 1 and a second lens element 2 sequentially arranged along an optical axis I from the eye side A1 to the display side A2. After being emitted, the imaging rays of the display image 99 may pass through the second lens element 2 and the first lens element 1 sequentially, and enter the eye of the observer from the pupil 0 of the observer. Then, the imaging rays may form an image in a retina of the eye of the observer.

Specifically, each of the first lens element 1 and the second lens element 2 of the ocular optical system 10 respectively includes eye-side surfaces 15 and 25 that is toward the eye side A1 and allows the imaging rays to pass through and a display-side surface 16 and 26 that is toward the display side A2 and allows the imaging rays to pass through.

Besides, in order to meet the demand for a lighter-weighted product, the first lens element 1 and the second lens element 2 are both having refracting power and made of plastic material. Nevertheless, it should be noted that the materials of the first lens element 1 and the second lens element 2 are not limited thereto. In the embodiment, among the lens element of the ocular optical system 10, only the first lens element 1 and the second lens element 2 have refracting power.

The first lens element 1 has a positive refracting power. The optical axis region 15p1 of the eye-side surface 15 of the first lens element 1 is plane, and the periphery region 15p3 thereof is plane. The optical axis region 161 of the display-side surface 16 of the first lens element 1 is convex, and the periphery region 163 thereof is convex. The display-side surface 16 of the first lens element 1 is a Fresnel surface F.

The second lens element 2 has a positive refracting power. The optical axis region 25p1 of the eye-side surface 25 of the second lens element 2 is plane, and the periphery region 25p3 thereof is plane. The optical axis region 261 of the display-side surface 26 of the second lens element 2 is convex, and the periphery region 263 thereof is convex. The display-side surface 26 of the second lens element 2 is a Fresnel surface F.

Other detailed optical data of the first embodiment are shown in FIG. 11. An effective focal length EFL of the ocular optical system 10 of the first embodiment is 29.969 millimeters (mm), a half apparent field of view (ω) thereof is 65.000°, and an f-number (Fno) thereof is 7.492. Specifically, the "f-number" in this specification refers to an f-number obtained by adopting the pupil 0 of the observer as an entrance pupil based on the principle of reversibility of light. Moreover, the image height of the ocular optical system 10 of the first embodiment is 29.157 mm, and the system length (SL) of the ocular optical system 10 of the first embodiment is 44.890 mm. SL refers to the distance from the pupil 0 of the observer to the display image 99 on the optical axis I. In addition, the effective radius in FIG. 11 refers to half of the clear aperture.

In the first embodiment, the display-side surfaces 16 and 26 of the first lens element 1 and the second lens element 2 are aspherical surfaces, and the display-side surfaces 16 and 26 of the first lens element 1 and the second lens element 2 are Fresnel surfaces F. The effective sub-surfaces of each tooth of the Fresnel surfaces F are aspherical surfaces, and the following aspherical coefficients of the display-side surfaces serve to represent the effective sub-surfaces of the teeth, and the aspherical surfaces are defined according to the following curve formula (1):

$$Z(Y) = \frac{Y^2}{R} \Bigg/ \left(1 + \sqrt{1-(1+K)\frac{Y^2}{R^2}}\right) + \sum_{i=1}^{n} a_i \times Y^i \quad (1)$$

Y: a vertical distance from a point on an aspheric curve to the optical axis;

Z: a depth of the aspherical surface (i.e., a vertical distance between the point on the aspherical surface that is spaced by the distance Y from the optical axis is Y and a tangent plane tangent to a vertex of the aspherical surface on the optical axis);

R: a radius of curvature of the surface of the lens element;

K: a conic coefficient;

$a_i$: an i-th order aspherical coefficients.

The aspherical coefficients of the display-side surfaces 16, 26 in the formula (1) are as shown in FIG. 12. In addition, the column labeled with the numeral 16 in FIG. 12 indicates the aspherical coefficients of the display-side surface 16 of the first lens element 1, and other columns are sorted based on the same principle.

In addition, the relations among the important parameters and conditions in the ocular optical system 10 of the first embodiment are as shown in FIG. 41.

EPD represents an exit pupil diameter of the ocular optical system 10, corresponding to a diameter of the pupil 0 of the observer;

ER represents a distance of eye relief, namely a distance from the pupil 0 of the observer to the first lens element 1 on the optical axis I;

ω represents the half apparent field of view, namely a half of the observer's field of view, as shown in FIG. 1;

T1 represents a thickness of the first lens element 1 on the optical axis I;

T2 represents a thickness of the second lens element 2 on the optical axis I;

G12 represents an air gap between the first lens element 1 and the second lens element 2 on the optical axis I;

G2D represents a distance from the display-side surface 26 of the second lens element 2 to the display image 99 on the optical axis I;

D1 represents the longest distance of the display-side surface 16 of the first lens element 1 through the center FC of the Fresnel surface F, as shown in FIG. 7A, wherein the center FC refers to the optical center of the Fresnel surface F, i.e., a center surrounded by the annular teeth of the Fresnel surface F;

D2 represents the longest side of the display image 99, i.e., the longer side of the display area AA of the display D, as shown in FIG. 7B;

D3 represents the width of the display-side surface 16 of the first lens element 1 through the center FC of the Fresnel surface F and parallel to the longest side of the display image 99, as shown in FIG. 7A;

D4 represents the longest distance of the display-side surface 16 of the first lens element 1 from the center FC of the Fresnel surface F to the circumference CF of the first lens element 1, as shown in FIG. 7A;

ImgH represents an image height of the ocular optical system 10;

ALT represents a sum of the thicknesses of the first lens element 1 and the second lens element 2 on the optical axis I, i.e., a sum of T1 and T2;

TL represents a distance from the eye-side surface 15 of the first lens element 1 to the display-side surface 26 of the second lens element 2 on the optical axis I;

TTL represents a distance from the eye-side surface 15 of the first lens element 1 to the display image 99 on the optical axis I;

SL represents a system length, i.e., a distance from the pupil 0 of the observer to the display image 99 on the optical axis I;

EFL represents the effective focal length of the ocular optical system 10.

In addition, the following is also defined:

f1 represents the focal length of first lens element 1;

f2 represents the focal length of the second lens element 2;

n1 represents the refractive index of first lens element 1;

n2 represents the refractive index of the second lens element 2;

V1 represents the Abbe number of the first lens element 1;

V2 represents the Abbe number of the second lens element 2.

Referring again to FIGS. 10A to 10D. FIGS. 10A to 10D illustrate the respective aberrations of the ocular optical system 10 according to the first embodiment. The aberrations are obtained by assuming the rays forming an image to be in a direction as the reversely tracking of the rays be a parallel imaging ray from the eye side A1 sequentially passing through the pupil 0 and the ocular optical system 10 to the display image 99. In the embodiment, the respective aberrations performances shown in each of above mentioned figures determines the corresponding aberration performance of the image formed by the imaging rays from the display image 99 on the retina of the eye of the observer. In other words, when the respective aberrations shown in the above mentioned diagrams are small, the respective aberrations of the image formed on the retina of the eye or the observer may also be smaller so the image with better imaging quality could be observed by the observer.

Figures 10A, 10B, 10C, 10D:
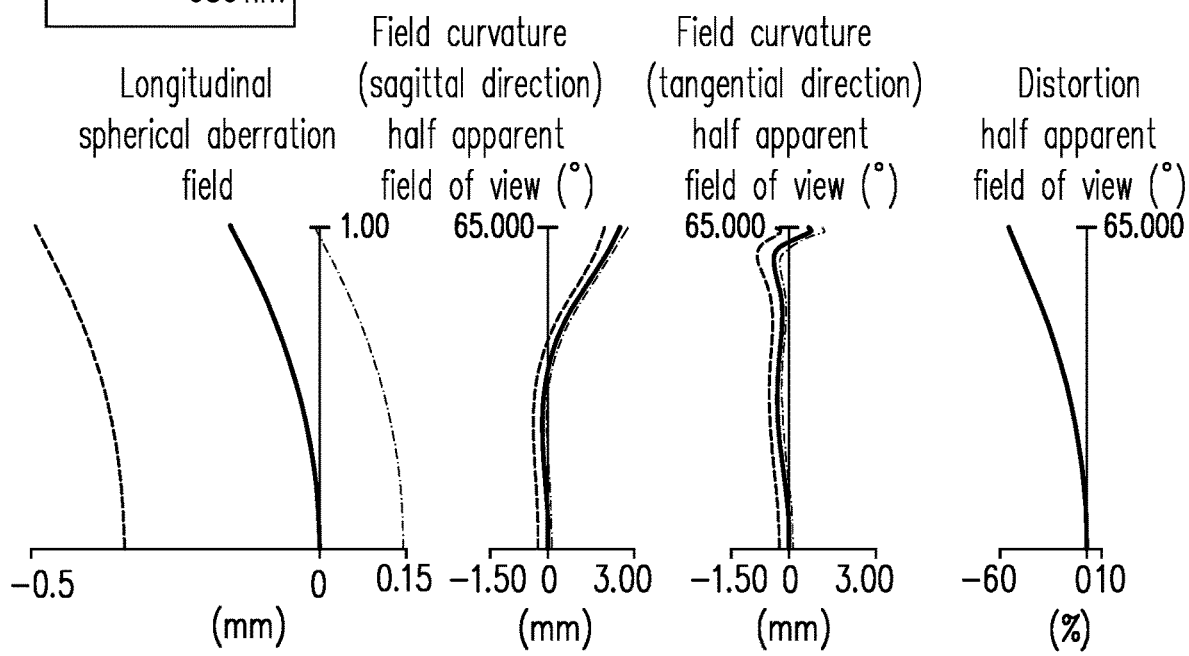
FIGS. 10A to 10D illustrate a longitudinal spherical aberration and other aberrations of the ocular optical system according to the first embodiment.

Specifically, FIG. 10A illustrates a longitudinal spherical aberration of the first embodiment, FIGS. 10B and 10C respectively illustrate a field curvature aberration in a sagittal direction and a field curvature in a tangential direction of the first embodiment, and FIG. 10D illustrates a distortion aberration of the first embodiment. The longitudinal spherical aberration of the first embodiment shown in FIG. 10A is obtained by simulating under a condition that the pupil radius is 2.000 mm (i.e., the exit pupil diameter EPD of the ocular optical system 10 is 4.000 mm). In FIG. 10A illustrating the longitudinal spherical aberration of the first embodiment, curves representing the respective wavelengths are close to each other and approach the center, indicating that off-axis rays of respective wavelengths in different heights are concentrated in a vicinity of an imaging point. Based on the extents of deviations of the curves for each of the wavelengths, the deviations of the imaging point of the off-axis rays of different heights are limited within a range of ±0.49 mm. Therefore, the embodiment clearly improves the spherical aberration of the same wavelength. Besides, distances among the curves of the three representing wavelengths of 486 nm, 588 nm and 656 nm are also quite small, indicating that the imaging positions of rays with different wavelengths are quite concentrated. Therefore, chromatic aberration is also clearly improved.

In FIGS. 10B and 10C illustrating the field curvature aberrations, field curvature aberrations of the three representing wavelengths over the entire field fall within a range of ±3.00 mm, indicating that the ocular optical system 10 according to the first embodiment is able to effectively eliminate aberrations. And in FIG. 10D illustrating the distortion aberration, it is shown that the distortion aberration of the first embodiment is maintained within a range of ±60%, indicating that the distortion aberration of the first embodiment satisfies a requirement on imaging quality of an optical system. Accordingly, compared with the conventional ocular optical system, the ocular optical system of the first embodiment is able to render a desirable imaging quality under a condition that the system length SL is reduced to about 44.890 mm. Therefore, the first embodiment is able to reduce the length of the ocular optical system while maintaining a desirable optical performance, thereby achieving a thinner product design. Besides, the ocular optical system 10 of the first embodiment has a larger apparent field of view, and is also able to correct aberrations and thus maintain a desirable imaging quality.

FIG. 13 is a schematic view of an ocular optical system according to the second embodiment of the present disclosure, and FIGS. 14A to 14D illustrate a longitudinal spherical aberration and other aberrations of the ocular optical system according to the second embodiment. Referring to FIG. 13, the ocular optical system 10 of the second embodiment of the present disclosure is roughly similar to that of the first embodiment, and the differences between the two are as set forth in the following. There are some differences in the optical data, the aspheric coefficients, and the parameters of the first lens element 1 and the second lens element 2 between the second embodiment and the first embodiment. It should be noted that for clear illustration, the numerals indicating the optical axis region and the periphery region similar to that of in the first embodiment are omitted in FIG. 13.

Detailed optical data of the ocular optical system 10 of the second embodiment are shown in FIG. 15. The effective focal length of the ocular optical system 10 of the second embodiment is 19.795 mm, the half apparent field of view (ω) thereof is 68.000°, the f-number (Fno) thereof is 4.949, the image height thereof is 29.828 mm, and system length SL thereof is 35.565 mm.

FIG. 16 shows the respective aspheric coefficients of the display-side surfaces 16 and 26 of the first lens element 1 and the second lens element 2 of the second embodiment in Formula (1).

In addition, the relations among the important parameters in the ocular optical system 10 of the second embodiment are as shown in FIG. 41.

The longitudinal spherical aberration of the second embodiment shown in FIG. 14A is obtained by simulating under a condition that the pupil radius is 2.000 mm (i.e., the exit pupil diameter EPD of the ocular optical system 10 is 4.000 mm). In FIG. 14A illustrating the longitudinal spherical aberration of the second embodiment, the deviations of the imaging points of the off-axis rays in different heights are limited within a range of ±0.36 mm. In FIGS. 14B and 14C illustrating the field curvature aberrations, the field curvature aberrations of the three representing wavelengths over the entire field fall within a range of ±13.00 mm. And in FIG. 14D illustrating the distortion aberration, it is shown that the distortion aberration of the second embodiment is maintained within a range of ±40%. Accordingly, compared to the conventional ocular optical system, the ocular optical system of the second embodiment is able to render a desirable imaging quality under the condition that the system length SL is reduced to about 35.565 mm.

Based on the above, the second embodiment is advantageous over the first embodiment in that the system length of the second embodiment is smaller than the system length of the first embodiment. The aperture of the second embodiment is larger than that of the first embodiment. The half apparent field of view of the second embodiment is greater than that of the first embodiment. The longitudinal spherical aberration of the second embodiment is smaller than that of the first embodiment. The field curvature of the second embodiment is smaller than that of the first embodiment.

Figure 17:
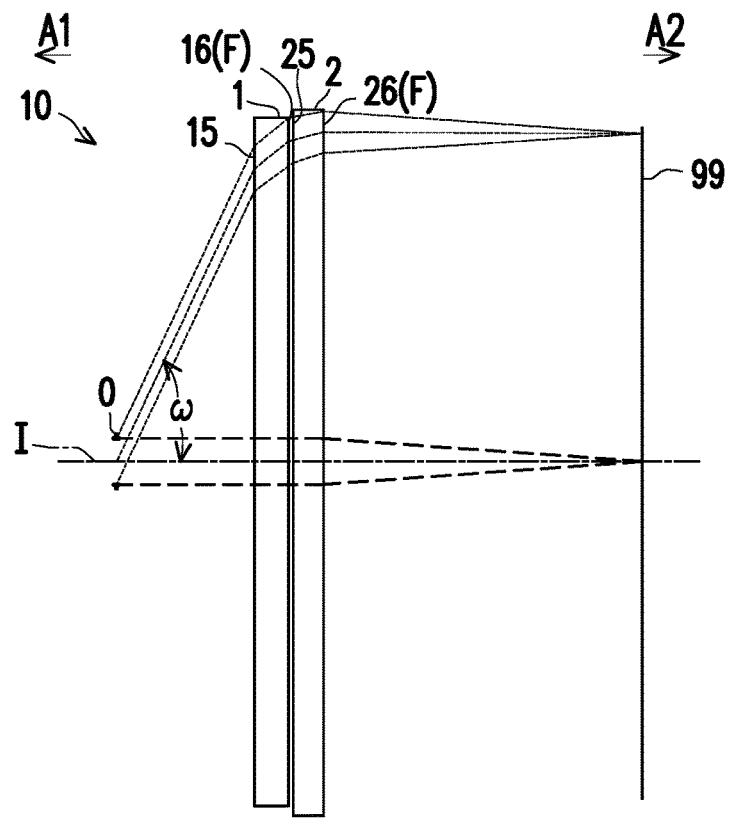
FIG. 17 is a schematic view illustrating an ocular optical system according to a third embodiment of the present disclosure.

FIG. 17 is a schematic view of an ocular optical system according to the third embodiment of the present disclosure, and FIGS. 18A to 18D illustrate the longitudinal spherical aberration and other aberrations of the ocular optical system according to the third embodiment. Referring to FIG. 17, the ocular optical system 10 of the third embodiment of the present disclosure is roughly similar to that of the first embodiment, and the differences between the two are set forth in the following. There are some differences in the optical data, the aspheric coefficients, and the parameters of the first lens element 1 and the second lens element 2 between the third embodiment and the first embodiment. It should be noted that for clear illustration, the numerals indicating the optical axis region and the periphery region similar to that of in the first embodiment are omitted in FIG. 17.

Detailed optical data of the ocular optical system 10 of the third embodiment are shown in FIG. 19. The effective focal length of the ocular optical system 10 of the third embodiment is 29.530 mm, the half apparent field of view (ω) thereof is 65.000°, the f-number (Fno) thereof is 7.382, the image height thereof is 29.009 mm, and system length SL thereof is 46.287 mm.

FIG. 20 shows the respective aspheric coefficients of the display-side surfaces 16 and 26 of the first lens element 1 and the second lens element 2 of the third embodiment in Formula (1).

In addition, the relations among the important parameters in the ocular optical system 10 of the third embodiment are as shown in FIG. 41.

Figures 18A, 18B, 18C, 18D:
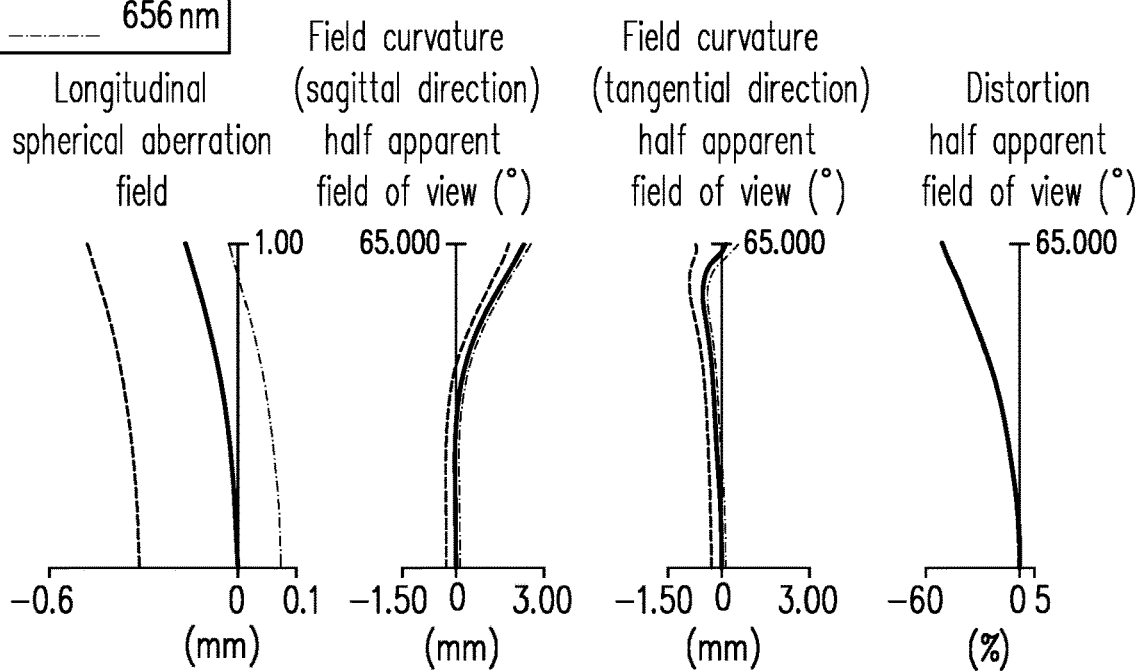
FIGS. 18A to 18D illustrate a longitudinal spherical aberration and other aberrations of the ocular optical system according to the third embodiment.

The longitudinal spherical aberration of the third embodiment shown in FIG. 18A is obtained by simulating under a condition that the pupil radius is 2.000 mm (i.e., the exit pupil diameter EPD of the ocular optical system 10 is 4.000 mm). In FIG. 18A illustrating the longitudinal spherical aberrations of the third embodiment, the deviations of the imaging points of the off-axis rays in different heights are limited within a range of ±0.53 mm. In FIGS. 18B and 18C illustrating the field curvature aberrations, the field curvature aberrations of the three representing wavelengths over the entire field fall within a range of ±2.80 mm. And in FIG. 18D illustrating the distortion aberration, it is shown that the distortion aberration of the third embodiment is maintained within a range of ±55%. Accordingly, compared to the conventional ocular optical system, the ocular optical system of the third embodiment is able to render a desirable imaging quality under the condition that the system length SL is reduced to about 35.565 mm.

Based on the above, the third embodiment is advantageous over the first embodiment in that the aperture of the third embodiment is larger than the aperture of the first embodiment. The field curvature of the third embodiment is smaller than that of the first embodiment.

Figure 21:
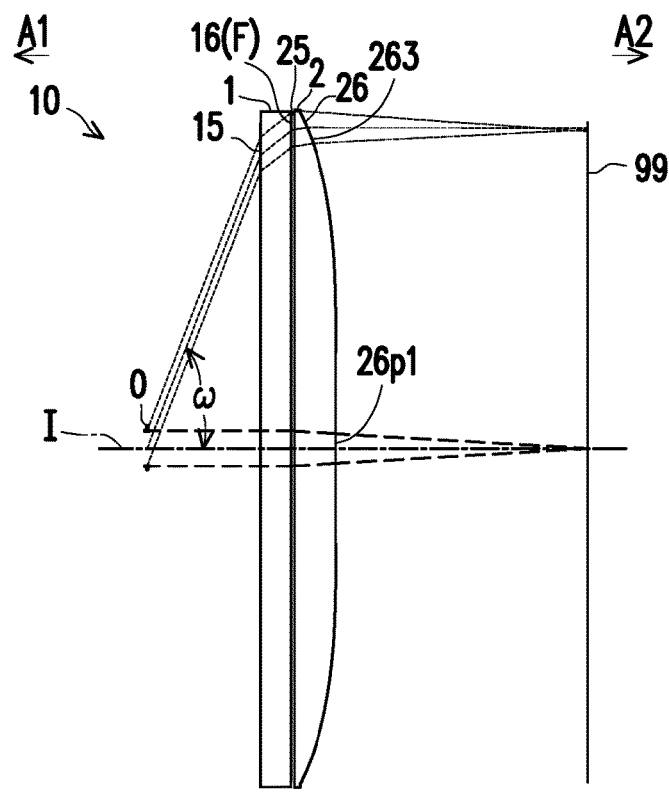
FIG. 21 is a schematic view illustrating an ocular optical system according to a fourth embodiment of the present disclosure.

FIG. 21 is a schematic view of an ocular optical system according to the fourth embodiment of the present disclosure, and FIGS. 22A to 22D illustrate a longitudinal spherical aberration and other aberrations of the ocular optical system according to the fourth embodiment. Referring to FIG. 21, the ocular optical system 10 of the fourth embodiment of the present disclosure is roughly similar to that of the first embodiment, and the differences between the two are as set forth in the following. There are some differences in the optical data, the aspheric coefficients, and the parameters of the first lens element 1 and the second lens element 2 between the fourth embodiment and the first embodiment. Moreover, in the fourth embodiment, the display-side surface 26 of the second lens element 2 is not a Fresnel surface but a generic aspheric surface. The optical axis region 26p1 of the display-side surface 26 of the second lens element 2 is a plane, and the periphery region 263 thereof is convex. It should be noted that for clear illustration, the numerals indicating the optical axis region and the periphery region similar to that of in the first embodiment are omitted in FIG. 21.

Detailed optical data of the ocular optical system 10 of the fourth embodiment are shown in FIG. 23. The effective focal length of the ocular optical system 10 of the fourth embodiment is 34.077 mm, the half apparent field of view (ω) thereof is 69.000°, the f-number (Fno) thereof is 8.519, the image height thereof is 33.665 mm, and system length SL thereof is 46.229 mm.

FIG. 24 shows the respective aspheric coefficients of the display-side surfaces 16 and 26 of the first lens element 1 and the second lens element 2 of the fourth embodiment in Formula (1). It is noted that Formula (1) is still applicable, even though the display-side surface 26 is not a Fresnel surface.

In addition, the relations among the important parameters in the ocular optical system 10 of the fourth embodiment are as shown in FIG. 41.

Figures 22A, 22B, 22C, 22D:
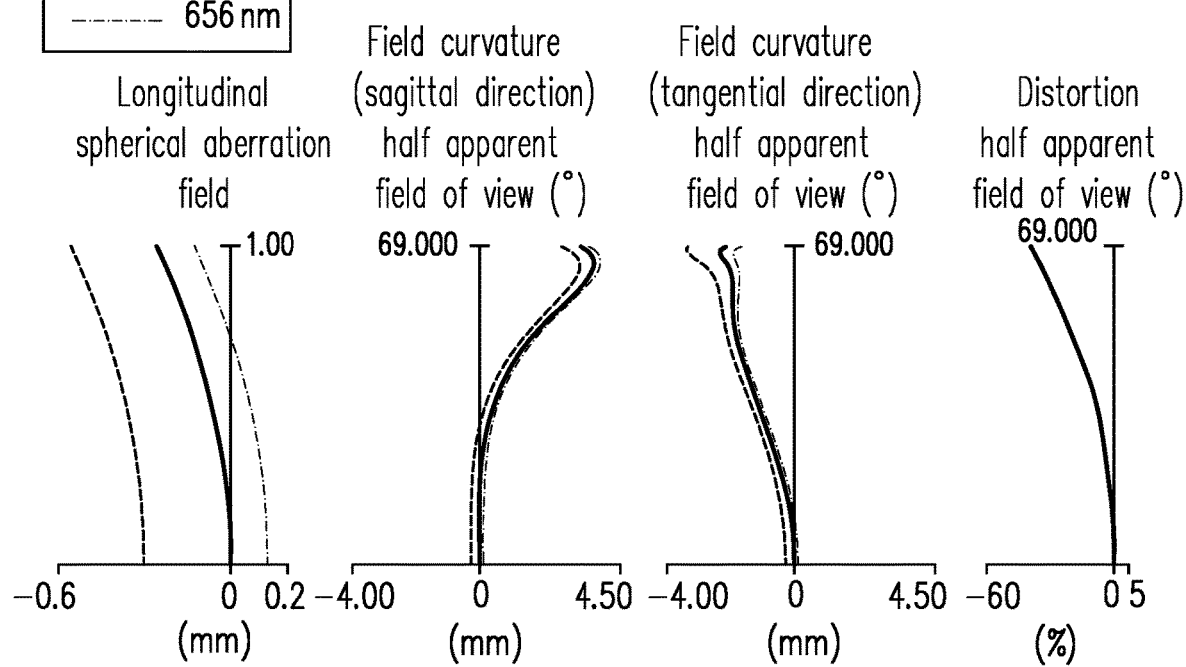
FIGS. 22A to 22D illustrate a longitudinal spherical aberration and other aberrations of the ocular optical system according to the fourth embodiment.

The longitudinal spherical aberration of the fourth embodiment shown in FIG. 22A is obtained by simulating under a condition that the pupil radius is 2.000 mm (i.e., the exit pupil diameter EPD of the ocular optical system 10 is 4.000 mm). In FIG. 22A illustrating the longitudinal spherical aberration of the fourth embodiment, the deviations of the imaging points of the off-axis rays in different heights are limited within a range of ±0.59 mm. In FIGS. 22B and 22C illustrating the field curvature aberrations, the field curvature aberrations of the three representing wavelengths over the entire field fall within a range of ±4.50 mm. And in FIG. 22D illustrating the distortion aberration, it is shown that the distortion aberration of the fourth embodiment is maintained within a range of ±60%. Accordingly, compared to the conventional ocular optical system, the ocular optical system of the fourth embodiment is able to render a desirable imaging quality under the condition that the system length SL is reduced to about 46.229 mm.

Based on the above, the fourth embodiment is advantageous over the first embodiment in that the half apparent field of view of the fourth embodiment is greater than the half apparent field of view of the first embodiment.

FIG. 25 is a schematic view of an ocular optical system according to the fifth embodiment of the present disclosure, and FIGS. 26A to 26D illustrate a longitudinal spherical aberration and other aberrations of the ocular optical system according to the fifth embodiment. Referring to FIG. 25, the ocular optical system 10 of the fifth embodiment of the present disclosure is roughly similar to that of the first embodiment, and the differences between the two are as set forth in the following. There are some differences in the optical data, the aspheric coefficients, and the parameters of the first lens element 1 and the second lens element 2 between the fifth embodiment and the first embodiment. It should be noted that for clear illustration, the numerals indicating the optical axis region and the periphery region similar to that of in the first embodiment are omitted in FIG. 25.

Detailed optical data of the ocular optical system 10 of the fifth embodiment are shown in FIG. 27. The effective focal length of the ocular optical system 10 of the fifth embodiment is 41.848 mm, the half apparent field of view (ω)

thereof is 65.000°, the f-number (Fno) thereof is 10.462, the image height thereof is 33.636 mm, and system length SL thereof is 61.657 mm.

FIG. 28 shows the respective aspheric coefficients of the display-side surfaces 16 and 26 of the first lens element 1 and the second lens element 2 of the fifth embodiment in Formula (1).

In addition, the relations among the important parameters in the ocular optical system 10 of the fifth embodiment are as shown in FIG. 41.

The longitudinal spherical aberration of the fifth embodiment shown in FIG. 26A is obtained by simulating under a condition that the pupil radius is 2.000 mm (i.e., the exit pupil diameter EPD of the ocular optical system 10 is 4.000 mm). In FIG. 26A illustrating the longitudinal spherical aberration of the fifth embodiment, the deviations of the imaging points of the off-axis rays in different heights are limited within a range of ±0.53 mm. In FIGS. 26B and 26C illustrating the field curvature aberrations, the field curvature aberrations of the three representing wavelengths over the entire field fall within a range of ±13.00 mm. And in FIG. 26D illustrating the distortion aberration, it is shown that the distortion aberration of the fifth embodiment is maintained within a range of ±62%. Accordingly, compared to the conventional ocular optical system, the ocular optical system of the fifth embodiment is able to render a desirable imaging quality under the condition that the system length SL is reduced to about 61.657 mm.

Based on the above, the fifth embodiment is advantageous over the first embodiment in that the manufacturing of the fifth embodiment is less difficult and the yield rate of assembling is more desirable.

Figure 29:
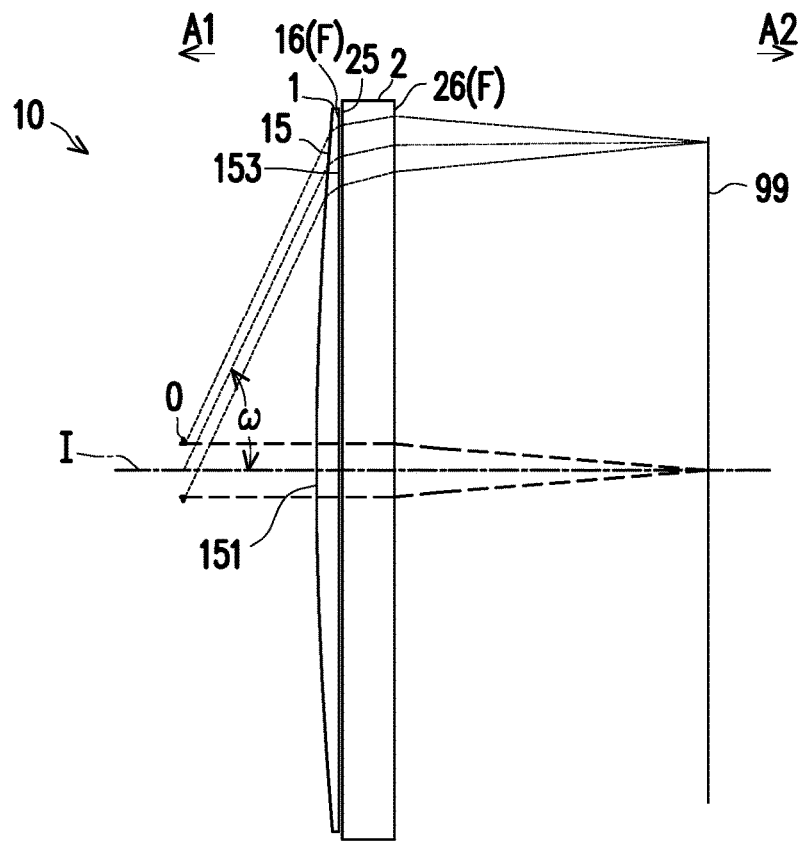
FIG. 29 is a schematic view illustrating an ocular optical system according to a sixth embodiment of the present disclosure.

FIG. 29 is a schematic view of an ocular optical system according to the sixth embodiment of the present disclosure, and FIGS. 30A to 30D illustrate a longitudinal spherical aberration and other aberrations of the ocular optical system according to the sixth embodiment. Referring to FIG. 29, the ocular optical system 10 of the sixth embodiment of the present disclosure is roughly similar to that of the first embodiment, and the differences between the two are as set forth in the following. There are some differences in the optical data, the aspheric coefficients, and the parameters of the first lens element 1 and the second lens element 2 between the sixth embodiment and the first embodiment. Moreover, in the sixth embodiment, the eye-side surface 15 of the first lens element 1 is convex, the optical axis region 151 thereof is convex, and the periphery region 153 thereof is convex. It should be noted that for clear illustration, the numerals indicating the optical axis region and the periphery region similar to that of in the first embodiment are omitted in FIG. 29.

Detailed optical data of the ocular optical system 10 of the sixth embodiment are shown in FIG. 31. The effective focal length of the ocular optical system 10 of the sixth embodiment is 24.391 mm, the half apparent field of view (ω) thereof is 65.000°, the f-number (Fno) thereof is 6.098, the image height thereof is 23.814 mm, and system length SL thereof is 37.789 mm.

FIG. 32 shows the respective aspheric coefficients of the display-side surfaces 16 and 26 of the first lens element 1 and the second lens element 2 of the sixth embodiment in Formula (1).

In addition, the relations among the important parameters in the ocular optical system 10 of the sixth embodiment are as shown in FIG. 41.

Figures 30A, 30B, 30C, 30D:
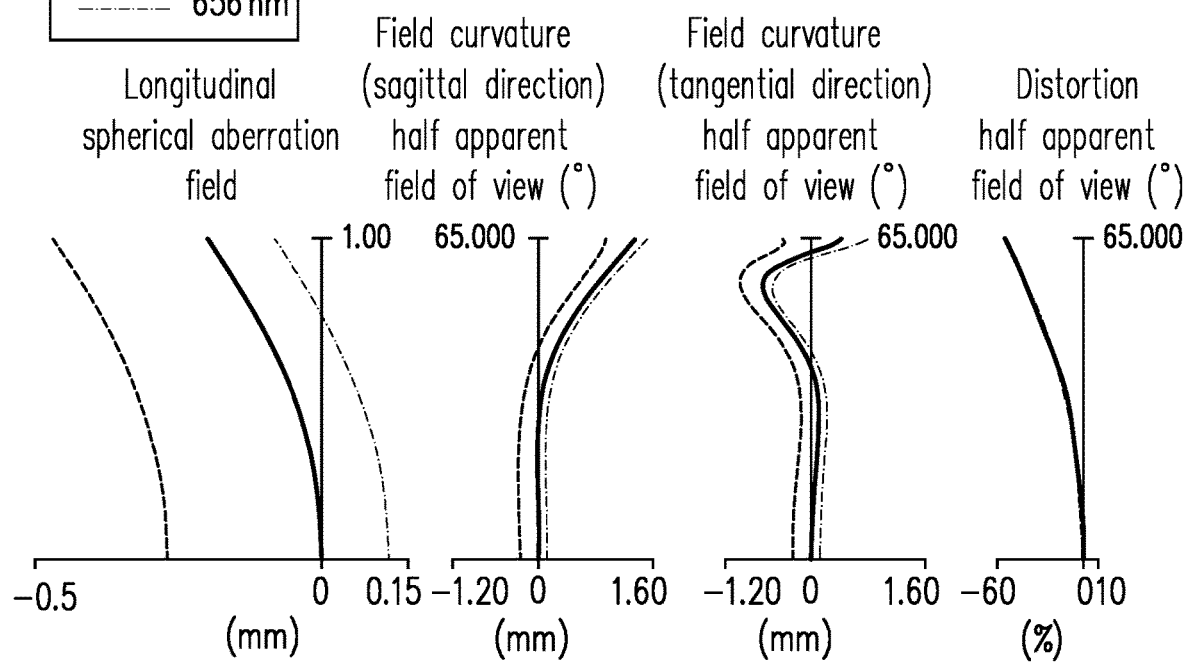
FIGS. 30A to 30D illustrate a longitudinal spherical aberration and other aberrations of the ocular optical system according to the sixth embodiment.

The longitudinal spherical aberration of the sixth embodiment shown in FIG. 30A is obtained by simulating under a condition that the pupil radius is 2.000 mm (i.e., the exit pupil diameter EPD of the ocular optical system 10 is 4.000 mm). In FIG. 30A illustrating the longitudinal spherical aberration of the sixth embodiment, the deviations of the imaging points of the off-axis rays in different heights are limited within a range of ±0.48 mm. In FIGS. 30B and 30C illustrating the field curvature aberrations, the field curvature aberrations of the three representing wavelengths over the entire field fall within a range of ±1.60 mm. And in FIG. 30D illustrating the distortion aberration, it is shown that the distortion aberration of the sixth embodiment is maintained within a range of ±55%. Accordingly, compared to the conventional ocular optical system, the ocular optical system of the sixth embodiment is able to render a desirable imaging quality under the condition that the system length SL is reduced to about 37.389 mm.

Based on the above, the sixth embodiment is advantageous over the first embodiment in that the aperture of the sixth embodiment is larger than the aperture of the first embodiment. The system length of the sixth embodiment is less than that of the first embodiment. The field curvature of the sixth embodiment is smaller than that of the first embodiment.

Figure 33:
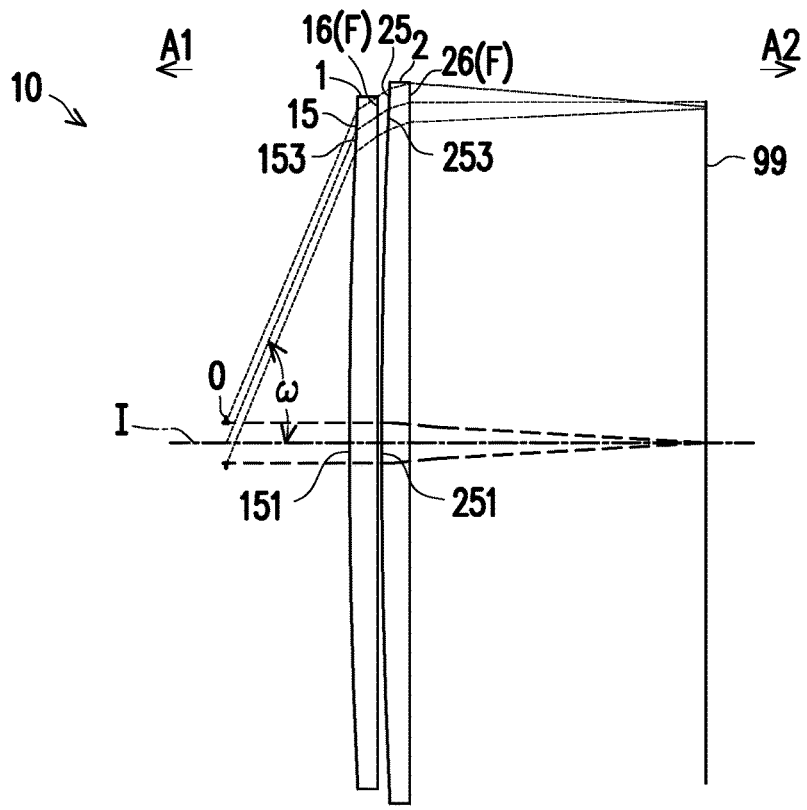
FIG. 33 is a schematic view illustrating an ocular optical system according to a seventh embodiment of the present disclosure.

FIG. 33 is a schematic view of an ocular optical system according to the seventh embodiment of the present disclosure, and FIGS. 34A to 34D illustrate a longitudinal spherical aberration and other aberrations of the ocular optical system according to the seventh embodiment. Referring to FIG. 33, the ocular optical system 10 of the seventh embodiment of the present disclosure is roughly similar to that of the first embodiment, and the differences between the two are as set forth in the following. The parameters of each optical data, aspheric coefficient, and first lens element 1 to second lens element 2 are somewhat different. Moreover, in the seventh embodiment, the eye-side surface 15 of the first lens element 1 is convex, the optical axis region 151 thereof is convex, and the periphery region 153 thereof is convex. The optical axis region 251 of the eye-side surface 25 of the second lens element 2 is convex, and the periphery region 253 thereof is convex. It should be noted that for clear illustration, the numerals indicating the optical axis region and the periphery region similar to that of in the first embodiment are omitted in FIG. 33.

Detailed optical data of the ocular optical system 10 of the seventh embodiment are shown in FIG. 35. The effective focal length of the ocular optical system 10 of the seventh embodiment is 33.108 mm, the half apparent field of view (ω) thereof is 67.500°, the f-number (Fno) thereof is 8.277, the image height thereof is 36.000 mm, and system length SL thereof is 50.215 mm.

FIG. 36 shows the respective aspheric coefficients of the display-side surfaces 16 and 26 of the first lens element 1 and the second lens element 2 of the seventh embodiment in Formula (1).

In addition, the relations among the important parameters in the ocular optical system 10 of the seventh embodiment are as shown in FIG. 41.

Figures 34A, 34B, 34C, 34D:
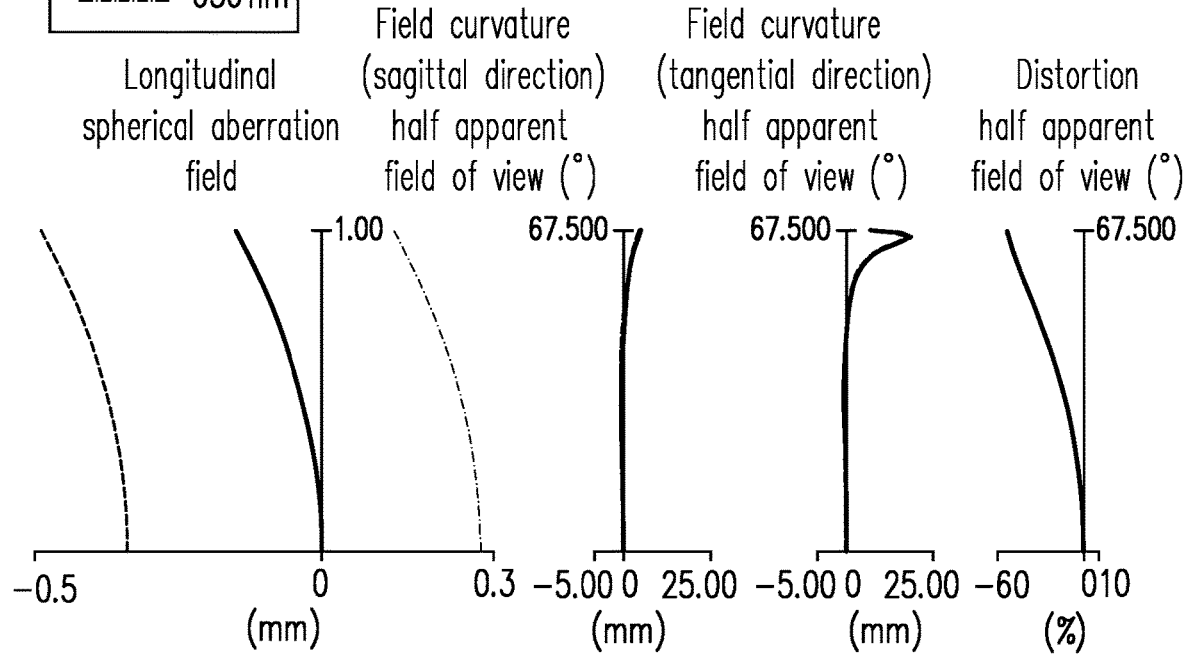
FIGS. 34A to 34D illustrate a longitudinal spherical aberration and other aberrations of the ocular optical system according to the seventh embodiment.

The longitudinal spherical aberration of the seventh embodiment shown in FIG. 34A is obtained by simulating under a condition that the pupil radius is 2.000 mm (i.e., the exit pupil diameter EPD of the ocular optical system 10 is 4.000 mm). In FIG. 34A illustrating the longitudinal spherical aberration of the seventh embodiment, the deviations of the imaging points of the off-axis rays in different heights are limited within a range of ±0.49 mm. In FIGS. 34B and 34C illustrating the field curvature aberrations, the field curvature aberrations of the three representing wavelengths over the entire field fall within a range of ±23.00 mm. And in FIG. 34D illustrating the distortion aberration, it is shown that the distortion aberration of the seventh embodiment is maintained within a range of ±55%. Accordingly, compared to the conventional ocular optical system, the ocular optical system of the seventh embodiment is able to render a desirable imaging quality under the condition that the system length SL is reduced to about 50.215 mm.

Based on the above, the seventh embodiment is advantageous over the first embodiment in that the half apparent field of view of the seventh embodiment is greater than the half apparent field of view of the first embodiment.

Figure 37:
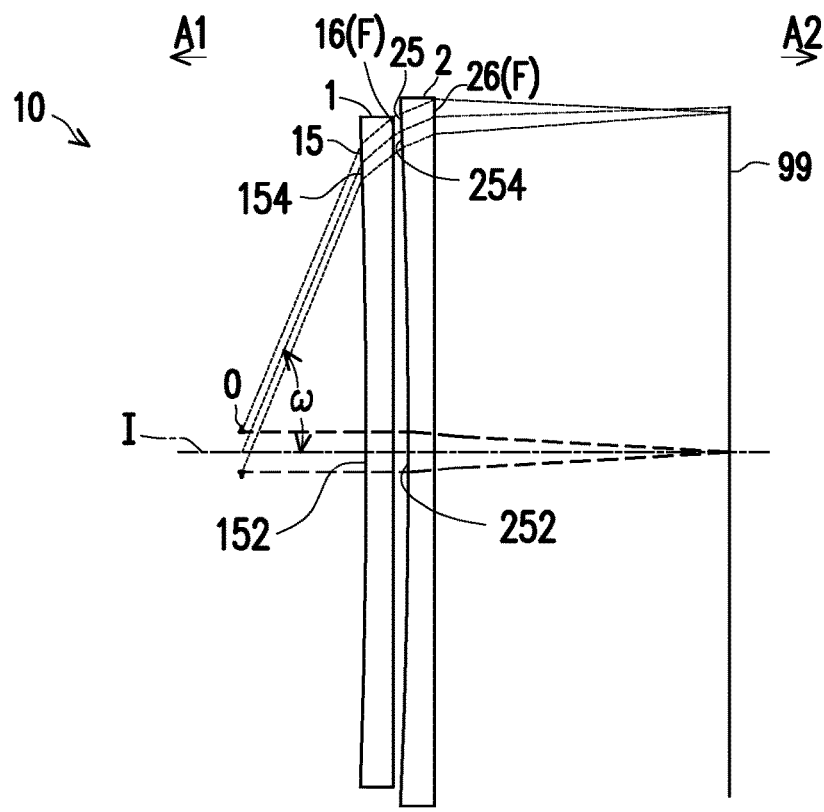
FIG. 37 is a schematic view illustrating an ocular optical system according to an eighth embodiment of the present disclosure.

FIG. 37 is a schematic view of an ocular optical system according to the eighth embodiment of the present disclosure, and FIGS. 38A to 38D illustrate a longitudinal spherical aberration and other aberrations of the ocular optical system according to the eighth embodiment. Referring to FIG. 37, the ocular optical system 10 of the eighth embodiment of the present disclosure is roughly similar to that of the first embodiment, and the differences between the two are as set forth in the following. There are some differences in the optical data, the aspheric coefficients, and the parameters of the first lens element 1 and the second lens element 2 between the eighth embodiment and the first embodiment. Moreover, in the eighth embodiment, the eye-side surface 15 of the first lens element 1 is a concave surface, the optical axis region 152 thereof is concave, and the periphery region 154 thereof is concave. The optical axis region 252 of the eye-side surface 25 of the second lens element 2 is concave, and periphery region 254 thereof is concave. It should be noted that for clear illustration, the numerals indicating the optical axis region and the periphery region similar to that of in the first embodiment are omitted in FIG. 37.

Detailed optical data of the ocular optical system 10 of the eighth embodiment are shown in FIG. 39. The effective focal length of the ocular optical system 10 of the eighth embodiment is 32.784 mm, the half apparent field of view (ω) thereof is 67.500°, the f-number (Fno) thereof is 37.517, the image height thereof is 35.995 mm, and system length SL thereof is 50.517 mm.

FIG. 40 shows the respective aspheric coefficients of the display-side surfaces 16 and 26 of the first lens element 1 and the second lens element 2 of the eighth embodiment in Formula (1).

In addition, the relations among the important parameters in the ocular optical system 10 of the eighth embodiment are as shown in FIG. 41.

Figures 38A, 38B, 38C, 38D:
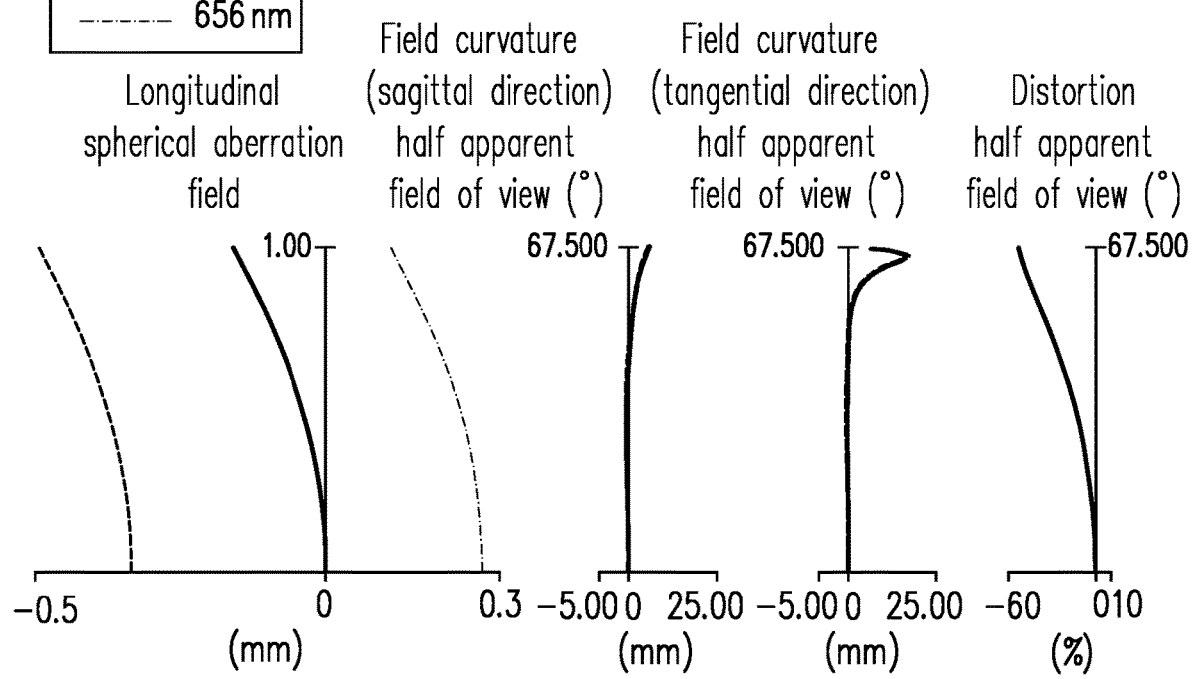
FIGS. 38A to 38D illustrate a longitudinal spherical aberration and other aberrations of the ocular optical system according to the eighth embodiment.

The longitudinal spherical aberration of the eighth embodiment shown in FIG. 38A is obtained by simulating under a condition that the pupil radius is 2.000 mm (i.e., the exit pupil diameter EPD of the ocular optical system 10 is 4.000 mm). In FIG. 38A illustrating the longitudinal spherical aberration of the eighth embodiment, the deviations of the imaging points of the off-axis rays in different heights are limited within a range of ±0.49 mm. In FIGS. 38B and 38C illustrating the field curvature aberrations, the field curvature aberrations of the three representing wavelengths over the entire field fall within a range of ±23.00 mm. And in FIG. 38D illustrating the distortion aberration, it is shown that the distortion aberration of the eighth embodiment is maintained within a range of ±55%. Accordingly, compared to the conventional ocular optical system, the ocular optical system of the eighth embodiment is able to render a desirable imaging quality under the condition that the system length SL is reduced to about 50.517 mm.

Based on the above, the eighth embodiment is advantageous over the first embodiment in that the half apparent field of view of the eighth embodiments is greater than the half apparent field of view of the first embodiment.

Referring to FIG. 41, FIG. 41 shows a table with the respective optical parameters of the first embodiment to the eighth embodiment. The unit of the parameters in the rows from "EFL" to "TL" are Millimeter (mm), except that the unit of "ω" is degree)(°, and "V1" and "V2" are dimensionless parameter. Parameters in the rows from "ω/TL" to "EFL/TL" are dimensionless parameter, except that the unit of "ω/TL" is °/mm.

Regarding the following conditions, at least one purpose is to maintain the effective focal length and the respective optical parameters at appropriate values to prevent any of the parameters from being excessively great and thus making it difficult to correct the aberrations of the whole ocular optical system 10 or prevent any of the parameters from being excessively small and thus influencing assembling or increasing the manufacturing difficulty.

Specifically,

The ocular optical system 10 may satisfy: 6.000≤EFL/T1, and more preferably may satisfy 6.000≤EFL/T1≤24.000.

The ocular optical system 10 may satisfy: 6.000≤EFL/T2, and more preferably may satisfy 6.000≤EFL/T2≤24.000.

The ocular optical system 10 may satisfy: 4.490≤EFL/ALT, and more preferably may satisfy 4.490≤EFL/ALT≤12.000.

The ocular optical system 10 may satisfy: 4.300≤EFL/TL, and more preferably may satisfy 4.300≤EFL/TL≤12.000.

Regarding the following conditions, at least one purpose is to maintain the thicknesses of and gaps between the respective lens elements at appropriate values to prevent any of the parameters from being excessively great and thus making it difficult to miniaturize the whole optical imaging lens 10 or prevent any of the parameters from being excessively small and thus influencing assembling or increasing the manufacturing difficulty.

Specifically,

The ocular optical system 10 may satisfy: 0.400≤T1/T2, and more preferably may satisfy 0.400≤T1/T2≤2.000.

The ocular optical system 10 may satisfy: 1.500≤T1/G12, and more preferably may satisfy 1.500≤T1/G12≤19.000.

The ocular optical system 10 may satisfy: 1.800≤T2/G12, and more preferably may satisfy 1.800≤T2/G12≤19.000.

The ocular optical system 10 may satisfy: 4.630≤TTL/ALT, and more preferably may satisfy 4.630≤TTL/ALT≤13.500.

The ocular optical system 10 may satisfy: 4.340≤TTL/TL, and more preferably may satisfy 4.340≤TTL/TL≤12.000.

The ocular optical system 10 may satisfy: 5.500≤G2D/T1, and more preferably may satisfy 5.500≤G2D/T1≤22.000.

The ocular optical system 10 may satisfy: 5.500≤G2D/T2, and more preferably may satisfy 5.500≤G2D/T2≤22.000.

In addition, it is optional to select a random combination relationship of the parameters in the embodiment to limit the optical system to further the design of the optical system having the same structure in the present disclosure.

Moreover, regarding the exemplary limiting relations listed above, the relations can be randomly and selectively combined and applied to the embodiments of the present disclosure in different manners; the disclosure should not be limited thereto. In the implementation of the present disclosure, in addition to the above-listed relations, it is also possible to add additional detailed structures such as more concave and convex curvatures arrangement of a specific lens element or a plurality of lens elements so as to enhance the control of system performance and/or resolution. It should be noted that the above mentioned details can be optionally combined and applied to other embodiments of the present disclosure under the condition where they are not in conflict with one another.

The invention as the combinations of optical parameters thereof fall within the numerical range described by the embodiments is enabled by the present disclosure.

In view of the foregoing, the ocular optical system 10 according to one or some exemplary embodiments of the present disclosure is able to render one or some of the following:

i. The longitudinal spherical aberrations, the astigmatic aberrations, and the distortion aberrations of the respective embodiments of the present disclosure meet the protocol of use. In addition, the off-axis rays of the three representing wavelengths, i.e., red, green, and blue, in different heights are all concentrated at a vicinity of the imaging point. The extents of deviation of the respective curves show that the imaging point deviations of the off-axis rays in different heights are controlled, so a desirable suppressing ability against spherical aberration, image aberration, and distortion aberration is rendered. The imaging quality data further suggest that the distances among the three representing wavelengths, i.e., red, green, and blue, are close to each other, indicating that the embodiments of the present disclosure are able to desirably concentrate rays of different wavelengths in various states and thus exhibit an excellent chromatic dispersion suppressing ability. Therefore, a desirable imaging quality is rendered.

ii. The ocular optical system 10 of an embodiment of the present disclosure is designed by the following arrangement of the lens elements: (1) the optical axis region 161 of the display-side surface 16 of the first lens element 1 is convex and the display-side surface 16 is a Fresnel surface F. (2) The optical axis region 261 or the periphery region 263 of the display-side surface 26 of the second lens element 2 is convex. And, with the conditional relations 6.500°/mm≤ω/TL≤30.0007 mm, 0.970≤D1/D2≤1.500 or 0.850≤D3/D2≤1.400 the light focusing of the ocular optical system 10 to form an image will be achieved by two lens elements that tend to have positive refracting power, which would contribute to increase the system's half apparent field of view without increasing the size and weight of the system while maintaining the size of the display image 99.

iii. In the case of the display-side surface 26 of the second lens element 2 being a Fresnel surface F, the difficulties in assembling due to a thin periphery region of the lens caused by increasing the refracting power of the periphery region to achieve a large half apparent field of view maybe avoid, and the volume and weight of the second lens element 2 can be reduced.

vi. In the case of the eye-side surface 15 of the first lens element 1 being convex, the imaging quality in the middle of the display image 99 is more desirable, the refracting power of the Fresnel surface F of the display-side surface 16 may be reduced to increase the yield rate. In the case of the eye-side surface 15 of the first lens element 1 being concave, the viewing comfort of the observer may be improved for the reason that the concave shape matches the convex configuration of the human eye. In addition, the imaging quality on the periphery of the display image 99 is more desirable, and it is easier to increase the half apparent field of view. In the case of the eye-side surface 15 of the first lens element 1 being a plane, it is easier to balance the imaging quality in the middle and on the periphery of the display image 99, and it is easier to manufacture and easier to improve the yield rate.

v. When the conditional relations 4.000≤D4/ALT or 3.750≤D4/TL is satisfied and are cooperated with the above combination of the surface shape structure, the optical effective diameter of the lens element may be increased while the thickness of the lens element remains. The above conditional relations may preferably be: 4.000≤D4/ALT≤19.500 and 3.750≤D4/TL≤17.400, respectively.

vi. When the conditional relation 1.100≤ω/arctan (D4/EFL) is satisfied and is cooperated with the above combination of the surface shape structure, the half apparent field of view may increase and the size of the display image 99 may be reduced at the same time. The conditional expression may preferably be: 1.100≤ω/arctan (D4/EFL)≤2.250. wherein arctan represents arctangent.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An ocular optical system, configured to allow imaging rays from a display image to enter an eye of an observer through the ocular optical system to form an image, wherein a side toward the eye is an eye side, and a side toward the display image is a display side, the ocular optical system comprises a first lens element and a second lens element sequentially arranged along an optical axis from the eye side to the display side, each of the first lens element and the second lens element comprising an eye-side surface facing the eye side and allowing the imaging rays to pass through and a display-side surface facing the display side and allowing the imaging rays to pass through;
   wherein an optical axis region of the eye-side surface of the first lens element is concave;
   an optical axis region of the eye-side surface of the second lens element is concave;
   wherein lens elements of the ocular optical system are only the two lens elements described above; and
   the ocular optical system satisfies:

4.340≤*TTL/TL*, wherein TTL is a distance from the eye-side surface of the first lens element to the display image on the optical axis, and TL is a distance from the eye-side surface of the first lens element to the display-side surface of the second lens element on the optical axis.

2. The ocular optical system as claimed in claim 1, wherein the ocular optical system further satisfies: 1.500≤T1/G12≤19.000, wherein T1 is a thickness of the first lens element on the optical axis, and G12 is an air gap between the first lens element and the second lens element on the optical axis.

3. The ocular optical system as claimed in claim 1, wherein the ocular optical system further satisfies: 6.500°/mm≤ω/TL≤30.000°/mm, wherein i is a half apparent field of view of the ocular optical system.

4. The ocular optical system as claimed in claim 1, wherein the display-side surface of the first lens element is a Fresnel surface.

5. The ocular optical system as claimed in claim 4, wherein the ocular optical system further satisfies: 4.000≤D4/ALT, wherein D4 is a longest distance of the display-side surface of the first lens element from the center of the Fresnel surface to a circumference of the first lens element, and ALT is a sum of thicknesses of the first lens element and the second lens element on the optical axis.

6. The ocular optical system as claimed in claim 1, wherein the ocular optical system further satisfies: 5.500≤G2D/T2, wherein G2D is a distance from the display-side surface of the second lens element to the display image on the optical axis, and T2 is a thickness of the second lens element on the optical axis.

7. The ocular optical system as claimed in claim 1, wherein the ocular optical system further satisfies: 6.000≤EFL/T1, wherein EFL is an effective focal length of the ocular optical system, and T1 is a thickness of the first lens element on the optical axis.

8. An ocular optical system, configured to allow imaging rays from a display image to enter an eye of an observer through the ocular optical system to form an image, wherein a side toward the eye is an eye side, and a side toward the display image is a display side, the ocular optical system comprises a first lens element and a second lens element sequentially arranged along an optical axis from the eye side to the display side, each of the first lens element and the second lens element comprising an eye-side surface facing the eye side and allowing the imaging rays to pass through and a display-side surface facing the display side and allowing the imaging rays to pass through;

wherein the second lens element has a positive refracting power, and an optical axis region of the eye-side surface of the second lens element is concave;

wherein lens elements of the ocular optical system are only the two lens elements described above; and the ocular optical system satisfies:

4.340≤*TTL/TL*, wherein TTL is a distance from the eye-side surface of the first lens element to the display image on the optical axis, and TL is a distance from the eye-side surface of the first lens element to the display-side surface of the second lens element on the optical axis.

9. The ocular optical system as claimed in claim 8, wherein the ocular optical system further satisfies: 1.800≤T2/G12≤19.000, wherein T2 is a thickness of the second lens element on the optical axis, and G12 is a length of an air gap between the first lens element and the second lens element on the optical axis.

10. The ocular optical system as claimed in claim 8, wherein the ocular optical system further satisfies: 4.630≤TTL/ALT, wherein ALT is a sum of thicknesses of the first lens element and the second lens element on the optical axis.

11. The ocular optical system as claimed in claim 8, wherein the display-side surface of the first lens element is a Fresnel surface.

12. The ocular optical system as claimed in claim 11, wherein the ocular optical system further satisfies: 0.970≤D1/D2≤1.500, wherein D1 is a longest distance of the eye-side surface of the first lens element through the center of the Fresnel surface, and D2 is a length of a longest side of the display image.

13. The ocular optical system as claimed in claim 11, wherein the ocular optical system further satisfies: 3.750≤D4/TL, wherein D4 is a longest distance of the display-side surface of the first lens element from the center of the Fresnel surface to a circumference of the first lens element.

14. The ocular optical system as claimed in claim 8, wherein the ocular optical system further satisfies: 6.000≤EFL/T2, wherein EFL is an effective focal length of the ocular optical system, and T2 is a thickness of the second lens element on the optical axis.

15. An ocular optical system, configured to allow imaging rays from a display image to enter an eye of an observer through the ocular optical system to form an image, wherein a side toward the eye is an eye side, and a side toward the display image is a display side, the ocular optical system comprises a first lens element and a second lens element sequentially arranged along an optical axis from the eye side to the display side, each of the first lens element and the second lens element comprising an eye-side surface facing the eye side and allowing the imaging rays to pass through and a display-side surface facing the display side and allowing the imaging rays to pass through;

wherein a periphery region of the eye-side surface of the first lens element is concave;

an optical axis region of the eye-side surface of the second lens element is concave;

wherein lens elements of the ocular optical system are only the two lens elements described above; and the ocular optical system satisfies:

5.500≤*G2D/T*1, wherein G2D is a distance from the display-side surface of the second lens element to the display image on the optical axis, and T1 is a thickness of the first lens element on the optical axis.

16. The ocular optical system as claimed in claim 15, wherein the display-side surface of the first lens element is a Fresnel surface.

17. The ocular optical system as claimed in claim 16, wherein the ocular optical system further satisfies: 0.850≤D3/D2≤1.400, wherein D3 is a distance of the eye-side surface of the first lens element passing through a center of the Fresnel surface and parallel to a direction of the longest side of the display image, and D2 is a length of a longest side of the display image.

18. The ocular optical system as claimed in claim 16, wherein the ocular optical system further satisfies: 1.100≤ω/arctan(D4/EFL), wherein i is a half apparent field of view of the ocular optical system, D4 is a longest distance of the display-side surface of the first lens element from the center of the Fresnel surface to a circumference of the first lens element, EFL is an effective focal length of the ocular optical system, and "arctan" represents the arctangent function.

19. The ocular optical system as claimed in claim 15, wherein the ocular optical system further satisfies: 0.400≤T1/T2≤2.000, wherein T2 is a thickness of the second lens element on the optical axis.

20. The ocular optical system as claimed in claim 15, wherein the ocular optical system further satisfies: 4.300≤EFL/TL, wherein EFL is an effective focal length of the ocular optical system, and TL is a distance from the eye-side surface of the first lens element to the display-side surface of the second lens element on the optical axis.

* * * * *